United States Patent
Tang et al.

(10) Patent No.: US 11,636,348 B1
(45) Date of Patent: Apr. 25, 2023

(54) ADAPTIVE TRAINING OF NEURAL NETWORK MODELS AT MODEL DEPLOYMENT DESTINATIONS

(71) Applicant: Apple Inc., Cupertino, CA (US)

(72) Inventors: Yichuan Tang, Sunnyvale, CA (US); Nitish Srivastava, San Francisco, CA (US); Ruslan Salakhutdinov, Pittsburgh, PA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 17/535,472

(22) Filed: Nov. 24, 2021

Related U.S. Application Data

(63) Continuation of application No. 15/606,889, filed on May 26, 2017, now abandoned.

(60) Provisional application No. 62/343,099, filed on May 30, 2016, provisional application No. 62/343,097, filed on May 30, 2016, provisional application No. 62/343,101, filed on May 30, 2016, provisional application No. 62/343,096, filed on May 30, 2016.

(51) Int. Cl.
| | | |
|---|---|---|
| *G06N 3/08* | (2006.01) | |
| *G06N 3/088* | (2023.01) | |
| *G06N 3/04* | (2023.01) | |
| *G01S 17/89* | (2020.01) | |

(52) U.S. Cl.
CPC .............. *G06N 3/088* (2013.01); *G06N 3/04* (2013.01); *G06N 3/08* (2013.01); *G01S 17/89* (2013.01)

(58) Field of Classification Search
CPC ............ G06N 3/088; G06N 3/04; G06N 3/08; G01S 17/89
See application file for complete search history.

(56) References Cited

U.S. PATENT DOCUMENTS

| | | |
|---|---|---|
| 6,449,384 B2 | 9/2002 | Laumeyer et al. |
| 8,127,075 B2 | 2/2012 | Thibadeau |
| 9,760,806 B1 | 9/2017 | Ning et al. |
| 9,984,446 B2 | 5/2018 | Ha et al. |
| 9,984,466 B1 | 5/2018 | Duran |
| 2010/0228694 A1 | 9/2010 | Le Roux |
| 2013/0238183 A1 | 9/2013 | Goulding |
| 2014/0310218 A1 | 10/2014 | Min |
| 2016/0300134 A1 | 10/2016 | Min |
| 2016/0362050 A1 | 12/2016 | Lee et al. |
| 2017/0015312 A1 | 1/2017 | Latotzki |

(Continued)

OTHER PUBLICATIONS

Widodo Budiharto, "Intelligent Surveillance Robot with Obstacle Avoidance Capabilities Using Neural Network", May 6, 2015, Hindawi Publishing Corporation (Year: 2015).*

(Continued)

*Primary Examiner* — Michael J Huntley
*Assistant Examiner* — Imad Kassim
(74) *Attorney, Agent, or Firm* — Robert C. Kowert; Kowert, Hood, Munyon, Rankin & Goetzel, P.C.

(57) ABSTRACT

At a centralized model trainer, one or more neural network based models are trained using an input data set. At least a first set of parameters of a model is transmitted to a model deployment destination. Using a second input data set, one or more adaptive parameters for the model are determined at the model deployment destination. Using the adaptive parameters, one or more inferences are generated at the model deployment destination.

20 Claims, 17 Drawing Sheets

(56) References Cited

U.S. PATENT DOCUMENTS

2017/0219353 A1    8/2017    Alesiani

OTHER PUBLICATIONS

Pablo Negri, "A Cascade of Boosted Generative and Discriminative Classifiers for Vehicle Detection", Jan. 16, 2008, Hindawi Publishing Corporation (Year: 2008).*
Faheem, "A Survey of Intelligent Car Parking System", vol. 11, Oct. 2013 (Year: 2013).*
Jeffrey Dean, "Large Scale Distributed Deep Networks", Google Inc., Mountain View, CA, 2012 (Year: 2012).*
Vinod Nair, et al., "Rectified Linear Units Improve Restricted Boltzmann Machines," Appearing in Proceedings of the 27 th International Conference on Machine Learning, Haifa, Israel, 2010, Copyright 2010 by the author(s)/owner(s). pp. 1-8.
Misha Denil, et al, "Learning where to Attend with Deep Architectures for Image Tracking," Cite as: arXiv:1109.3737 Sep. 16, 2011, pp. 1-30.
Alex Graves, "Generating Sequences With Recurrent Neural Networks," Jun. 5, 2014, pp. 1-43. arXiv:1308.0850v5 [cs.NE].
Volodymyr Mnih, et al., "Recurrent Models of Visual Attention," Part of: Advances in Neural Information Processing Systems 27 (NIPS 2014), Jun. 24, 2014, pp. 1-12.
Dzmitry Bahdanau, et al., "Neural Machine Translation By Jointly Learning To Align and Translate," Published as a conference paper at ICLR 2015, pp. 1-15.
Karol Gregor, et al., "DRAW: A Recurrent Neural Network For Image Generation," Proceedings of the 32nd International Conference on Machine Learning, Lille, France, 2015. JMLR: W&CP vol. 37. Copyright 2015 by the author(s), May 20, 2015, pp. 1-10.
Kelvin Xu, et al., "Show, Attend and Tell: Neural Image Caption Generation with Visual Attention," Proceedings of the 32 nd International Conference on Machine Learning, Lille, France, 2015. JMLR: W&CP vol. 37. Copyright 2015 by the author(s).Apr. 19, 2016, pp. 1-22.
Shikhar Sharma, et al., "Action Recognition Using Visual Attention," Workshop track—ICLR 2016, Feb. 14, 2016, pp. 1-11.
Hugo Larochelle, et al., "Learning to combine foveal glimpses with a third-order Boltzmann machine," Part of: Advances in Neural Information Processing Systems 23, Curran Associates, Inc., 2010, pp. 1-9.
Max Jaderberg, et al., "Spatial Transformer Networks," Part of: Advances in Neural Information Processing Systems 28 (NIPS 2015) pp. 1-9.
Ruslan Salakhutdinov, et al., "Deep Boltzmann Machines," Appearing in Proceedings of the 12th International Conference on Artificial Intelligence and Statistics (AISTATS) 2009, Clearwater Beach, Florida, USA. vol. 5 of JMLR:W&CP 5. Copyright 2009 by the authors. pp. 1-8.
Ross Girshick, "Fast R-CNN," The IEEE International Conference on Computer Vision (ICCV), 2015, pp. 1440-1448.
Yichuan Tang, et al., "Learning Generative Models with Visual Attention," Part of: Advances in Neural Information Processing Systems 27 (NIPS 2014) pp. 1-9.
Serena Yeung, et al,. "Every Moment Counts: Dense Detailed Labeling of Actions in Complex Videos," CoRR, abs/1507.05738, 2015. pp. 1-10.
David P. Reichert, et al., "A Hierarchical Generative Model of Recurrent Object-Based Attention in the Visual Cortex," In ICANN (1), vol. 6791, pp. 18-25. Springer, 2011. pp. 1-8.
Paul Viola, et al., "Rapid Object Detection using a Boosted Cascade of Simple Features," In IEEE Conf. on Computer Vision and Pattern Recognition, 2001, pp. 1-9.
Girshick, R., Donahue, J., Darrell, T., and Malik, J. Region-based convolutional networks for accurate object detection and semantic segmentation. IEEE Trans. Pattern Analysis and Machine Intelligence, May 2015. Graves, Alex. Generating sequences with recurrent neural networks. CoRR, abs/1308.0850, 2013. pp. 1-16.
Tsotsos, J. K., Culhane, S. M.,Wai,W. Y. K., Lai, Y. H., Davis, N., and Nuflo, F. Modeling visual-attention via selective tuning. Artificial Intelligence, 78(1-2):507-545, Oct. 1995.
Burda, Y., Grosse, R., and Salakhutdinov, R. Importance-weighted Autoencoders. International Conference on Learning Representations, 2016.
Cho, Kyunghyun, van Merrienboer, Bart, Gulcehre, C aglar, Bahdanau, Dzmitry, Bougares, Fethi, Schwenk, Holger, and Bengio, Yoshua. Learning phrase representations using RNN encoder-decoder for statistical machine translation. In Proceedings of the 2014 Conference on Empirical Methods in Natural Language Processing, EMNLP 2014, pp. 1724-1734, 2014.
Goodfellow, I., Pouget-Abadie, J., Mirza, M., Xu, B., Warde-Farley, D., Ozair, S., Courville, A., and Bengio, Y. Generative adversarial nets. In Neural Information Processing Systems, 2014.
Hurri, Jarmo and Hyvarinen, Aapo. Simple-cell-like receptive fields maximize temporal coherence in natural video. Neural Computation, 15(3):663-691, 2003Massachusetts Institute of Technology.
Denton, Emily L., Chintala, Soumith, Szlam, Arthur, and Fergus, Robert. Deep generative image models using a aplacian pyramid of adversarial networks. In NIPS, 2015, pp. 1-9.
Kingma, D. P. and Welling, M. "Auto-Encoding Variational Bayes". International Conference on Learning Representations, 2014, pp. 1-14.
Rezende, D. J., Mohamed, S., and Wierstra, D. "Stochastic backpropagation and approximate inference in deep generative models". International Conference on Machine Learning, pp. 1278-1286, 2014.
Sutskever, Ilya, Vinyals, Oriol, and Le, Quoc V. V. "Sequence to sequence learning with neural networks". In Advances in Neural Information Processing Systems 27, pp. 3104-3112. 2014.
Ranzato, Marc'Aurelio, Szlam, Arthur, Bruna, Joan, Mathieu, Michael, Collobert, Ronan, and Chopra, Sumit. "Video (language) modeling: a baseline for generative models of natural videos". CoRR, abs/1412.6604, 2014, pp. 1-15.
Srivastava, N., Mansimov, E., and Salakhutdinov, R. "Unsupervised learning of video representations using LSTMs". ICML, 2015, pp. 1-12.
Sukhbaatar, Sainbayar, Szlam, Arthur, Weston, Jason, and Fergus, Rob. "End-to-end memory networks". In Advances in Neural Information Processing Systems. 2015, pp. 1-11.
Radford, Alec, Metz, Luke, and Chintala, Soumith. "Unsupervised representation learning with deep convolutional generative adversarial networks". International Conference on Learning Representations, 2016, pp. 1-16.
Hochreiter, Sepp and Schmidhuber, Jurgen. "Long short-term memory". Neural Computation, 1997, pp. 1-32.
Krizhevsky, Alex, Sutskever, Ilya, and Hinton, Geoffrey. "Imagenet classification with deep convolutional neural networks". In Advances in Neural Information Processing Systems. 2012, pp. 1-9.
Michalski, Vincent, Memisevic, Roland, and Konda, Kishore. "Modeling deep temporal dependencies with recurrent grammar cells". In Advances in Neural Information Processing Systems 27, pp. 1925-1933. Curran Associates, Inc., 2014.
Karpathy, Andrej, Toderici, George, Shetty, Sanketh, Leung, Thomas, Sukthankar, Rahul, and Fei-Fei, Li. "Large-scale video classification with convolutional neural networks". In CVPR, 2014, pp. 1-8.
Le, Q. V., Zou, W., Yeung, S. Y., and Ng, A. Y. "Learning hierarchical spatio-temporal features for action recognition with independent subspace analysis". In CVPR, 2011, pp. 3361-3368.
Susskind, J., Memisevic, R., Hinton, G., and Pollefeys, M. "Modeling the joint density of two images under a variety of transformations". In Proceedings of IEEE Conference on Computer Vision and Pattern Recognition, 2011, pp. 2793-2800.
Van Hateren, J. H. and Ruderman, D. L. "Independent component analysis of natural image sequences yields spatio-temporal filters similar to simple cells in primary visual cortex". Proceedings. Biological sciences / The Royal Society, 265(1412):2315-2320, 1998.
Shimodaira, Hidetoshi. "Improving predictive inference under covariate shift by weighting the log-likelihood function". Journal of statistical planning and inference, 90(2):227-244, 2000.

(56) References Cited

OTHER PUBLICATIONS

Bickel, Steffen, Brckner, Michael, and Scheffer, Tobias. "Discriminative learning for differing training and test distributions". In In ICML, pp. 81-88. ACM Press, 2007.
Cortes, C., Mohri, M., Riley, M., and Rostamizadeh, A. "Sample selection bias correction theory". In ALT, 2008, pp. 1-16.
Baxter, J. "A model of inductive bias learning". Journal of Artificial Intelligence Research, 12:149-226, 2000.
Ioffe, Sergey and Szegedy, Christian. "Batch normalization: Accelerating deep network training by reducing internal covariate shift". In Proceedings of the 32nd International Conference on Machine Learning, ICML 2015, Lille, France, Jul. 6-11, 2015, pp. 448-456, 2015.
Ben-David, S., Blitzer, J., Crammer, K., and Pereira, F. "Analysis of representations for domain adaptation". In NIPS, 2007, pp. 1-8.
Huang, J., Smola, A., Gretton, A., Borgwardt, K., and Schoelkopf, B. "Correcting sample selection bias by unlabeled data". In NIPS, 2007, pp. 1-8.
Daume, III, Hal and Marcu, Daniel. "Domain adaptation for statistical classifiers". Journal of Artificial Intelligence Research 26 (2006) 101-126.
Jiang, J. and Zhai, C. "Instance weighting for domain adaptation in NLP". In ACL, 2007, pp. 1-8.
Xue, G., Dai, W., Yang, Q., and Yu, Y. "Topic-bridged PLSA for cross-domain text classification". In SIGIR, 2008, pp. 1-8.
Bengio, Y. "Learning deep architectures for AI". Foundations and Trends in Machine Learning, 2009, pp. 1-130.
Larochelle, H., Bengio, Y., Louradour, J., and Lamblin, P. "Exploring strategies for training deep neural networks". Journal of Machine Learning Research, 10:1-40, 2009.
Guo, Honglei, Zhu, Huijia, Guo, Zhili, Zhang, Xiaoxun, Wu, Xian, and Su, Zhong. Domain adaptation with latent semantic association for named entity recognition. In NAACL, 2009, pp. 281-289.
Foka, et al., "Probabillistic Autonomous Robot Navigation in Dynamic Environments with Human Motion Prediction," Jan. 6, 2010, Int J Soc Robert (2010)2, pp. 79-94.
Arteche, Josu "Gaussian Semiparametric Estimation in Long Memory in Stochastic Volatility and Signal Plus Noise Models," Journal of Econometrics 119.1 (2004): 131-154, 2004.
Knowles, David A., "Stochastic Gradient Variational Bayes for Gamma Approximating Distributions," arXiv preprent arXiv: 1509.01631 (2015).
Robingson, Peter M. "The Memory of Stochastic Colatiltiy Models," Journal of Econometrics 101.2 (2001): 195-218, 2001.
U.S. Appl. No. 17/561,880, filed Dec. 24, 2021, Yichuan Tang, et al.
Huang, F. and Yates, A. "Distributional representations for handling sparsity in supervised sequence-labeling". In ACL, 2009, pp. 495-503.
Blitzer, J., McDonald, R., and Pereira, F. "Domain adaptation with structural correspondence learning". In EMNLP, 2006, pp. 120-128.
Srivastava, N. and Salakhutdinov, R. "Multimodal learning with deep boltzmann machines". To appear in Journal of Machine Learning Research, 2014, pp. 2949-2980.
Memisevic, Roland. "Learning to relate images". IEEE Transactions on Pattern Analysis and Machine Intelligence, 35(8):1829-1846, 2013.
Memisevic, Roland and Hinton, Geoffrey E. "Learning to represent spatial transformations with factored higherorder boltzmann machines". Copyright Roland Memisevic, Geoffrey Hinton 2009, Department of Computer Science, University of Toronto, Jul. 27, 2009, pp. 1-15.
U.S. Appl. No. 15/606,875, filed May 26, 2017, Yichuan Tang, et al.
U.S. Appl. No. 15/606,884, filed May 26, 2017, Yichuan Tang, et al.
Garica et al., "Moion Prediction of Regions Through the Statistical Temporal Analysis Using and AutoRegressive Moving Average (ARMA) Model", 2014, Research in Computing Science 77 (2014), p. 9-20 (Year: 2014).
Wang et al., "Visual Tracking with Fully Convolutional Networks", 2015, The IEEE International Conference on Computer Vision (ICCV), 2015, pp. 3119-3127.
Widodo Budiharto, "Intelligent Surveillance Robot with Obstacle Avoidance Capabilities Using Neural Network", May 6, 2015, Hindawi Publishing Corporation, 2015, pp. 1-6.
Pablos Negri, "A Cascade of Boosted Generative and Discriminative Classifiers for Vehicle Detection", Jan. 16, 2008, Hindawi Publishing Corporation, 2008, pp. 1-12.
Faheem, "A Survey of Intelligent Car Parking System", vol. 11, Oct. 2013, pp. 1-13.
Jeffrey Dean, "Large Scale Distributed Deep Networks", Google Inc., Mountain View, CA, 2012, pp. 1-11.

\* cited by examiner

ADAPTIVE TRAINING OF NEURAL NETWORK MODELS AT MODEL DEPLOYMENT DESTINATIONS

This application is a continuation-in-part of U.S. patent application Ser. No. 15/606,889, filed May 26, 2017, entitled ADAPTIVE TRAINING OF NEURAL NETWORK MODELS AT MODEL DEPLOYMENT DESTINATIONS, which claims priority to: U.S. Provisional Patent Application Ser. No. 62/343,096, filed May 30, 2016, entitled SYSTEMS AND METHODS FOR ADAPTIVE DEEP NEURAL NETWORKS ON LOCAL DEVICES BY REMOVING COVARIATE SHIFTING; U.S. Provisional Patent Application Ser. No. 62/343,097, filed May 30, 2016, entitled SYSTEMS AND METHODS FOR ADAPTIVE DEEP NEURAL NETWORKS ON LOCAL DEVICES USING DYNAMIC GATING; U.S. Provisional Patent Application Ser. No. 62/343,099, filed May 30, 2016, entitled SYSTEMS AND METHODS FOR ADAPTIVE DEEP NEURAL NETWORKS ON LOCAL DEVICES USING LOCAL RETRAINING; and U.S. Provisional Patent Application Ser. No. 62/343,101, filed May 30, 2016, entitled SYSTEMS AND METHODS FOR ADAPTIVE DEEP NEURAL NETWORKS ON LOCAL DEVICES USING HYBRID MODULATION AND RETRAINING. The disclosures of the foregoing Applications are incorporated herein by reference in their entirety.

TECHNICAL FIELD

This disclosure generally relates to computer systems for training and executing deep neural network based machine learning models.

DESCRIPTION OF THE RELATED ART

Machine learning models are being used for an increasing number of application domains, including for example physical and network security, finance, medicine and the like. In particular, in recent years, deep neural network-based models (DNNs) have been developed for many such applications. Machine learning models including DNNs may typically be trained on data collected from a wide range of scenarios to maximize their generalization ability. For example, a deep neural network for detecting and tracking people in surveillance camera videos may be trained using videos collected from cameras in different positions, across multiple lighting conditions and situated in diverse environments including indoor spaces such as stairways, rooms, lobbies or hallways as well as outdoor locations. Unfortunately, once trained, a given model may have to be utilized in an environment which may not necessarily share many of the characteristics of at least some of the environments from which training data was collected. As a result, depending on the extent of such environmental differences, a given model may not necessarily perform very well in a particular environment in which it is deployed.

SUMMARY OF EMBODIMENTS

According to some embodiments, a system may include a model trainer and one or more model deployment destinations. The model trainer may comprise a first set of one or more computing devices, which may for example comprise one or more servers located at a centralized training facility. A given model deployment destination may comprise a second set of one or more computing devices, and may include a set of sensors such as image sensors, LIDAR (light detection and ranging) devices, temperature sensors, infrared sensors and the like in various embodiments. Examples of model deployment destinations may include smart camera systems, autonomous vehicles, smart phones and the like in different embodiments. The model trainer may comprise instructions that when executed on one or more processors cause the first set of one or more computing devices to train, using a first input data set, a first neural network based model, e.g., at the centralized training facility. The first input data set may comprise, among other elements, large collections of sensor data collected from a variety of operating environments. For example, in an embodiment in which the first input data set includes video data, it may include videos captured in low-light, in bright sunshine, from indoor locations, from outdoor locations, from stationary surveillance cameras, from moving video cameras installed in vehicles, and so on. A wide variety of neural network models may be trained at the centralized training facility in different embodiments for numerous applications such as object recognition, classification, action prediction and the like, including for example discriminative models, generative models, or models which combine discriminative and generative components. After a first stage of training has been performed by the model trainer, the model(s) and at least a subset of the learned model parameters may be transmitted to various deployment destinations. At a given deployment destination, one or more adaptive parameters for the model(s) may be learned locally, e.g., using a locally-obtained second input data set and an unsupervised learning algorithm, in effect customizing the model(s) for the local operating conditions of the deployment destination device. In some embodiments at least a subset of parameters learned at the centralized training facility may remain unchanged during the adaptive learning procedures of the deployment destination device. The models may be adapted in an iterative manner in some embodiments, with parameters being updated as new sensor data is collected. After one or more iterations of the adaptive learning, versions of the models with the adaptive parameters may be used for inference at the model deployment destination in various embodiments.

Any of a number of model adaptation approaches may be employed singly or in combination at the model deployment destinations in various embodiments to customize models for the operating environments of the deployment destinations. In one embodiment, for example, a technique which involves removal of covariate shifting may be employed. In another embodiment, at least two models may be used: an auxiliary embedding model which generates vector representations of the environment, and a master model whose operations are modulated based on the output generated by the auxiliary model. In some embodiments, several different categories of parameters of a joint or combined generative and discriminative model may learn prior to deployment, including some parameters learned using clusters of the training data corresponding to respective sets of environmental conditions. At least the cluster-specific parameters may be adapted at the deployment destinations in such embodiments, while at least some cluster-independent parameters may remain fixed. Combinations of these approaches may be employed in various embodiments.

According to one embodiment, a method may comprise training a first neural network based model by a model trainer using a first input data set. At least a first set of parameters of the model may be transmitted to a model deployment destination. At the deployment destination, one or more adaptive parameters for the model may be determined with the help of a second input data set, e.g., using some combination of the adaptive learning techniques mentioned above, and the adapted model may be used to generate inferences.

According to another embodiment, a non-transitory computer-readable storage medium may store instructions that when executed on one or more processors cause the one or more processors to determine, at a model deployment destination, that at least a first set of parameters of one or more neural network based models has been received from a trainer resource. At least a portion of training of the one or more neural network based models may have been performed at the trainer resource using a first input data set. The instructions when executed may cause the one or more processors to obtain, at the model deployment destination, using a second input data set, one or more adaptive parameters for at least one model of the one or more neural network based models. Using at least one model of the one or more neural network based models and the one or more adaptive parameters, at least one inference may be generated at the model deployment destination.

Figure 1A:
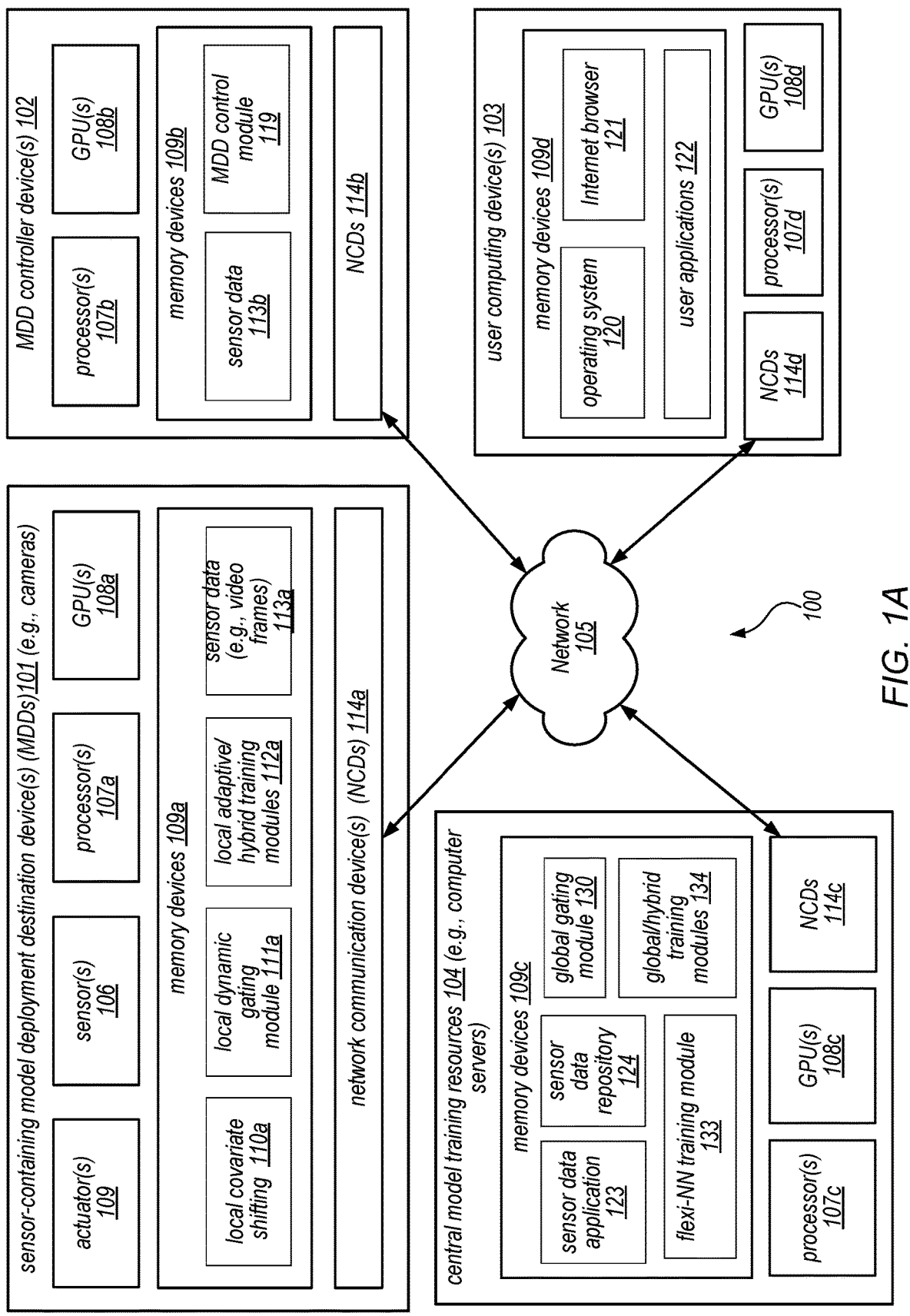
FIG. 1A illustrates an example system environment comprising a central model training resource and one or more model deployment destination devices, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

It will be appreciated that for simplicity and clarity of illustration, in some cases, reference numerals may be repeated among the figures to indicate corresponding or analogous elements. In addition, some details or features are set forth to provide a thorough understanding of the embodiments described herein. However, it will be understood by those of ordinary skill in the art that the embodiments described herein are illustrative examples that may be practiced without these details or features. In other instances, well-known methods, procedures and components have not been described in detail so as not to obscure the concepts illustrated in the examples described herein. Also, the description is not to be considered as limiting the scope of the example embodiments described herein or illustrated in the drawings.

Machine learning models may typically be trained on data collected from a wide range of scenarios to maximize their generalization ability. For example, a deep neural network based machine learning model for detecting and tracking people in surveillance camera videos may be trained at a central training environment on videos collected from cameras in different positions, across multiple lighting conditions and pointed at diverse environments including indoor spaces (e.g. stairways, rooms, lobbies, hallways, airport concourses, elevators, parking garages, etc.) as well as outdoor scenes (e.g. sport venues, roads, parking lots, amusement parks, parks, etc.). It is noted that the terms "neural network based model", "neural network model" and "neural network" may be used synonymously with respect to various embodiments to refer to a machine learning model that includes or utilizes at least one network of artificial neurons. The term "deep neural network" (DNN) may be used in various embodiments to refer to a neural network which comprises a plurality of layers of artificial neurons.

In at least some embodiments, a trained or partially trained version of a model may be deployed for eventual execution at a variety of devices which may be referred to as deployment destination devices or deployment destinations. Such deployment destinations may, for example, include various types of cameras with computing capabilities, autonomous vehicles, smart phones, augmented reality devices, virtual reality devices, and the like, at least some of which may be equipped with sufficient computing components such as processors, memory and the like to perform various types of operations on or with machine learning models. In some embodiments, the deployment destinations may include or have access to various types of local sensors, such as cameras, LIDAR devices, radar devices, infra-red sensors, motion sensors, gyroscopes and the like, some of which may be able to capture or generate the kinds of data which may at least in principle be used to train the models. Deployment destinations may be referred to as "local devices" in some embodiments.

When a model is deployed for execution to a destination, it may sometimes operate in a much more restricted environment or setting than the collection of settings from which the training data was collected. This may be especially applicable, for example, for surveillance cameras that are mounted at a fixed location, or for autonomous vehicles which may operate in a variety of cities, states, regions or countries and in a variety of weather conditions. As a consequence, the assumption that the distribution over training examples matches the distribution over the data available as input for the models in real (post-training) use cases may not necessarily hold. Furthermore, in at least some embodiments, for example due to privacy concerns, network bandwidth limitations and the like, it may not even be possible to transmit locally collected sensor data to a centralized training resource.

Embodiments of several methods and systems are described herein for continuous or iterative local on-device adaptation of the parameters of deep neural network models to improve performances of models at deployment destinations. For example, using the systems and methods described herein, security camera models deployed at various airports or other locations may be able to maintain accuracy irrespective of the lighting or the layout of any particular airport or location. In another example, smart camera models that are deployed in parking lots in many different locations (e.g. at different stores, different buildings, different weather conditions, different time zones, etc.) may be able individually adapt to their specific location and local environment, taking into account local variances in parking lot layout, lighting, types of cars, etc. Autonomous vehicles may be able to adapt or customize neural network models to their operating environments to help make motion control decisions in at least some embodiments using the algorithms and techniques described herein.

One example embodiment may include a computing system designed to remove covariate shift specifically in the context of on-device adaptations. Such an approach may, for example, factor one or more weight matrices of a neural network into a dense and diagonal component such that the diagonal component can be easily adapted to new environments.

Another example embodiment may include a computing system designed to multiplicatively gate the global neural network where the gating is conditioned on the statistics of the input received locally at the deployment destination. Such an approach may, for example, make a more comprehensive modification (e.g., not just a diagonal modification) and in effect produce a new set of neural network parameters for any given environment.

In some embodiments, a computing system may be designed to facilitate further training and adaptation of a model on a local device after deployment from a central server configured to perform an initial level of training. The training algorithm on the central server before deployment may in effect be designed to be aware that further training will take place locally on the deployment destination. Such an approach may utilize backpropagation in some embodiments.

In various embodiments, adaptive or customizable techniques for training neural network models may be applicable to a variety of types of deep neural networks (DNNs). Non-limiting example types of deep neural networks may include convolutional, deconvolutional, and fully connected deep networks in various embodiments.

It is noted that although several of the examples described herein include camera devices or video surveillance devices as deployment destinations or local devices to which models are transmitted after at least some level of training, the local devices need not necessarily be camera or video related in at least some embodiments. For example, local devices or deployment destinations may comprise an Internet of Things (IoT) device, smart cars (e.g. fully autonomous or semi-autonomous cars), drone vehicles, mobile devices such as smart phones, AR/MR/VR (augmented reality/mixed reality/virtual reality) devices such as headsets and the like, or another type of computing device in various embodiments. Devices that have a processor device, memory and a communication device for receiving data (e.g. observations and models from a central server system) may be considered a local device or deployment destination in various embodiments. Non-limiting examples of observation data which may be used to train the DNNs centrally and/or at deployment destinations in various embodiments may include video data, still digital image data, LIDAR (light detection and ranging) data, radar data, audio data, biometric data, pressure sensor data, temperature data, infrared data, speed data, traffic data, communications data, and other sensor data.

FIG. 1A illustrates an example system environment comprising a centralized or central model training resource and one or more model deployment destination devices, according to at least some embodiments. As shown, system 100 may include one or more model deployment destinations (MDDs) or local devices 101, one or more MDD controller devices 102, one or more user computing devices 103, and one or more central model training resources 104. The MDDs may, for example, comprise smart camera devices (e.g., devices which comprise cameras as well as computing resources such as processors and memories), autonomous vehicles, smart phones and the like in different embodiments. The central model training resources, which may also be referred to as model training initiators or initial model trainers in various embodiments, may for example comprise one or more computer servers in at least some embodiments. Devices 101, 102, 103 and 104 may be able to communicate with each other over a data network 105 in the depicted embodiment. The data network may include different types of data connections, for example, including both wired and wireless connections.

In the depicted embodiment, an MDD 101 may include one or more sensors 106 (e.g., to capture video data or still data), one or more processors 107a, one or more graphics processing units (GPUs) 108, and/or one or more actuators 109 associated with the sensors 106 (e.g., to control a camera's pan, zoom or tilt). In embodiments in which image sensors are used, the image sensors, for example, may include complementary metal-oxide-semiconductor (CMOS) sensors or charge-coupled device (CCD) sensors. In some embodiments in which cameras are used, electromechanical actuators 109 may be used, while in other embodiments functionality similar to that of electromechanical actuators may be implemented via software. The MDD 101 may include one or more memory devices 109a and one or more network communication devices 114a to communicate with the network 105 in various embodiments. A memory device 109a may store, for example, a local covariate shifting module 110a, a local dynamic gating module 111a, a local adaptive/hybrid training or retraining module 112b, as well as sensor data 113a which may collected locally at the MDD in the depicted embodiment. Individual ones of the modules 110a, 111a, and/or 112a may be implemented using some combination of hardware and/or software in different embodiments. In at least some embodiments, a respective module may be implemented for adaptive training and/or training of hybrid modules. Modules 110a, 111a, 112a may be used in isolation from each other in some embodiments, and at least some of these modules may not need to be present on the same device in various embodiments. For example, a module 110a may be present on a given MDD; or in another example, module 111a may be present on a given MDD; or in another example, module 112a may be implemented on the MDD; or in another example, combinations of one or more of these modules 110a, 111a, 112a may reside on a given MDD such as a camera device. Sensor data 113a, such as video data, may include a collection of digital images (or video frames) comprising pixels in various embodiments. Some of the examples herein refer to observation records, which may include such video data in various embodiments.

In some embodiments, the sensors and/or the actuators may exist on or be incorporated within a separate device than the processors, GPUs and/or memory. In one example embodiment, hundreds, or thousands, or millions of MDDs may be in data communication with the central model training resources 104 via the network 105. In some embodiments, some subset or all of the MDDs 101 (and/or their sensors) may be stationary, while in other embodiments, at least some of the MDDs may be moving at one or more points in time (e.g., an MDD may be mounted on a moving vehicle, mounted on a moving platform, etc.) A combination of moving and stationary MDDs 101 may be used in some embodiments.

In embodiments in which camera sensors are used, any of a variety of camera types may be employed, including for example webcams, Internet Protocol security cameras, etc. An MDD controller device 102 (e.g., a camera controller) may include one or more processors 107b, one or more GPUs 108b, one or more memory devices 109b, and one or more network communication devices 114b in the depicted embodiment. A camera controller may, for example, adjust the pan, tilt, zoom, or combinations thereof of one or more cameras or camera sensors of an MDD in some embodiments. The memory devices 109b may comprise sensor data 113b as well as an MDD control module 119 in some embodiments.

A user computing device 103 may include one or more processors 107d, one or more GPUs 108d, one or more network communication devices 114d, one or more memory devices 109d, and/or one or more peripheral devices not shown in FIG. 1A. A memory device 109d may, for example, include an operating system 120 and an Internet browser 121 to access a portal provided by the central model training resources 104, or a user application 124 such as a video application resident in memory 109d may be used to view and interact with the data provided by the resources 104. In an example embodiment, the user computing device may include any one of a tablet, a laptop, a desktop computer, a mobile device, a smart phone, a wearable computer, a computer built into a car or other vehicle, etc. In various embodiments one or more programmatic interfaces (such as application programming interfaces, web-based consoles graphical user interfaces or command line tools) implemented by the central model training resources 104 may be invoked from the user computing devices as needed, e.g., to indicate various preferences, issue requests associated with sensor data processing and receive responses, and so on.

The central model training resources 104 may comprise one or more cloud-based servers in some embodiments. The central model training resources 104 may be referred to as a server system in various embodiments. The central model training resources 104 may include one or more processors 107c, one or more GPUs 108c, one or more network communication devices 114c, and one or more memory devices 109c in the depicted embodiment. The memory devices may store, for example, a sensor data repository 124 (such as a video database) and a sensor data application 123 (such as a video application) in the depicted embodiment. The sensor data application 123 may comprise a graphic user interface (GUI) which can be accessed from user computing devices 103 in some embodiments. The memory 109c may also include a flexible-neural-network (flex-NN) training module 133, a global gating module 130, and/or one or more global/hybrid training modules 134 in the depicted embodiment.

In some embodiments, the flex-NN training module 133 may be used to train a type of neural network using unlabeled observation data (e.g. video data) from multiple sensors. Such a flexible neural network may be transmitted and loaded onto the local covariate shifting module 110 of a MDD 101, which uses locally obtained observation data (e.g. video data) to adjust various parameters (e.g., mean and variance parameters) of the local version of the flexible neural network in some embodiments as described below in further detail.

In one embodiment, the global gating module 130 may use observation data from many different sensors to develop deep neural networks that can be transmitted and loaded onto the local dynamic gating module 111a on an MDD 101. The local dynamic gating module 111a may then use locally obtained observation data (e.g. video data) from sensors 106 to determine local gating parameters as described below in further detail.

In some embodiments, separate global and hybrid training modules may be implemented at central model training resources 104. In some such embodiments, a global training module 134 may use observation data from many different sensors to develop a deep neural network that can be transmitted and loaded onto a local adaptive retraining module 112a on an MDD 101. The local adaptive retraining module 112a may then use locally obtained observation data (e.g. video data) from sensors 106 to locally retrain the deep neural network.

In at least one embodiment, a hybrid training module 134 of the central model training resource 104 may use observation data from many different sensors to develop a deep neural network that can be transmitted and loaded onto the local hybrid retraining module 112a on an MDD 101. The local hybrid retraining module 112a may use one or both of local dynamic gating and adaptive retraining to adapt the transmitted model to the locally obtained observation data (e.g. video data) in some embodiments.

The use of modules 110a, 111a, 112a which reside and operate locally on the MDD 101 may reduce bandwidth requirements associated with sending sensor data to the central training resources 104 or any other computing device in various embodiments. Furthermore, by having the computations executed locally, the time taken to process sensor data may be reduced in some embodiments, relative to a scenario in which the sensor data is transmitted to the central model training resources for analysis. Data that may be considered sensitive may not need to be transmitted back to the centralized model training resources 104 in various embodiments. The individual modules residing on each MDD may adapt to the characteristics of their particular operating environments in various embodiments.

In various embodiments, one or more GPUs 108 (e.g., 108a, 108b, 108c or 108d) may be used to perform machine learning-related computations, such as computations involved in training and/or executing deep neural network models, instead of or in addition to being used to perform graphics-related operations.

In one example embodiment, an MDD may include a camera, a chip to convert the image signal (e.g. CCD signal or CMOS signal) to a frame buffer, followed by a bus connecting it to a microprocessor. The microprocessor can include one or more of Digital Signal Processors (DSPs), Field Programmable Gate Arrays (FPGAs), Systems on Chip (SOCs), and/or mobile GPUs cards.

A local adaptation of a neural network model by removing covariate shift may be implemented by a module 110a at an MDD 101, and initially facilitated by module 133, in at least some embodiments. Details of an algorithm for model adaptation by removing covariate shift are provided below in the context of FIG. 2. Local adaptation by using dynamic gating may be implemented by module 111a and initially facilitated by module 130 in at least some embodiments. Details regarding dynamic gating are provided below, e.g., with respect to at least FIG. 3-FIG. 5. Local adaptation using hybrid models and iterative local retraining may be implemented with the help of modules 112a and 134 in various embodiments, and is discussed further below in the context of at least FIG. 6-FIG. 13.

In some embodiments, customized versions of neural network-based models may be generated at a deployment destination such as an autonomous or partially-autonomous vehicle. The term "autonomous vehicle" may be used broadly herein to refer to vehicles for which at least some motion-related decisions (e.g., whether to accelerate, slow down, change lanes, etc.) may be made, at least at some points in time, without direct input from the vehicle's occupants. In various embodiments, it may be possible for an occupant to override the decisions made by the vehicle's decision making components, or even disable the vehicle's decision making components at least temporarily. Furthermore, in some embodiments, a motion-related decision-making component of the vehicle may request or require an occupant to participate in making some decisions under certain conditions. The vehicle may include one or more sensors, one or more sensor controllers, and a set of on-board computing devices. The vehicle may also include a motion control subsystem, which controls a plurality of wheels of the vehicle contacting a road surface.

In some embodiments, the motion control subsystem may include components such as the braking system, acceleration system, turn controllers and the like. The components may collectively be responsible for causing various types of movement changes (or maintaining the current trajectory) of vehicle, e.g., in response to directives or commands issued by decision making components. In some embodiments, the decision components may include a motion selector responsible for issuing relatively fine-grained motion control directives to various motion control subsystems, as well as a planner responsible for making motion plans applicable for longer time periods such as several seconds. The rate at which directives are issued to the motion control subsystem may vary in different embodiments. Under some driving conditions (e.g., when a cruise control feature of the vehicle is in use on a straight highway with minimal traffic) directives to change the trajectory may not have to be provided to the motion control subsystems at some points in time. For example, if a decision to maintain the current velocity of the vehicle is reached by the decision-making components, and no new directives are needed to maintain the current velocity, the motion selector may not issue new directives even though it may be capable of providing such directives at that rate.

The motion selector may determine the content of the directives to be provided to the motion control subsystem based on several inputs processed by the on-board computing devices. In various embodiments, the on-vehicle computing devices and/or the vehicle may represent one example of a module deployment device (e.g. MDD 101) to which one or more neural network-based models are deployed from a central training resource 104. In some embodiments, the computing devices computer 145 may comprise a local covariate shifting module 110a, a local dynamic gating module 111a, and/or a local adaptive/hybrid training module 112a. The computing devices may include an image analyzer which in turn utilizes one or more neural networks adapted using modules 110a, 111a or 112a to analyze road images as the vehicle moves. A model trained initially at a centralized training resource and associated parameters may be received at the autonomous vehicle in the depicted embodiment, and adapted to a local environment within which the vehicle operates, using some combination of components 110a, 111a and 112a, together with sensor data 113b collected from sensors. Network communication devices 114a may be used to communicate with the centralized training resources in the depicted embodiment.

A wide variety of sensors may be employed in the depicted embodiment, including video cameras, radar devices, LIDAR (light detection and ranging) devices and the like. In addition to conventional video and/or still cameras, in some embodiment near-infrared cameras and/or depth cameras may be used. In some embodiments, the sensors may comprise one or more camera devices which may themselves represent examples of MDDs. Different types of sensors may be used in different contexts. For example, while certain image sensors can capture good quality sensor data during high-light scenarios, they may provide very little useful sensor data in low-light scenarios, as the image data may not be able to distinguish objects within the environment. However, other sensors, such as a LIDAR sensor may have good low light capabilities. Because different sensors may capture redundant information (e.g., like the image sensor and LiDAR example above), fusion techniques may sometimes be implemented to leverage the strengths of different sensors in different scenarios. Several of these devices may be used to repeatedly generate successive frames in a continuous video of the surroundings of the vehicle and/or the interior of the vehicle over a period of time. For example, a LIDAR device may be used to produce a LIDAR video, and/or an infrared camera may be used to produce an infrared video. In some embodiments, additional sensors may be used to generate videos and/or add information to the captured scene, which may be included in at least some video frames captured by vehicle cameras. Such additional sensors may include radars, ultrasonic sensors, light beam scanning devices, infrared devices, location sensors (e.g., global positioning satellite (GPS) or Differential GPS (DGPS)), or inertial measurement sensors (e.g., accelerometers, speedometers, odometers, and angular rate sensors, like gyroscopes). All of these sensors may capture and provide raw sensor data to respective sensor data processing pipelines implemented by the on-vehicle computing devices to make perception decisions, such as detecting, classifying, or tracking road objects. Such data may be used for local adaptive training of neural network models in at least some embodiments.

In some embodiments, the vehicle computing devices may communicate with a sensor controller to control the operation of the sensors. For example, in some embodiments, the computing devices or the sensor controller may implement a camera control module. The camera control module may operate to control various aspects of the vehicle's sensors, such as for example the pan-tilt-zoom operations of the cameras installed in the vehicle. In some embodiments, the sensors may include actuators such as the actuators 109. Thus, in some embodiments the sensors may allow some degree of movement.

Figure 1B:
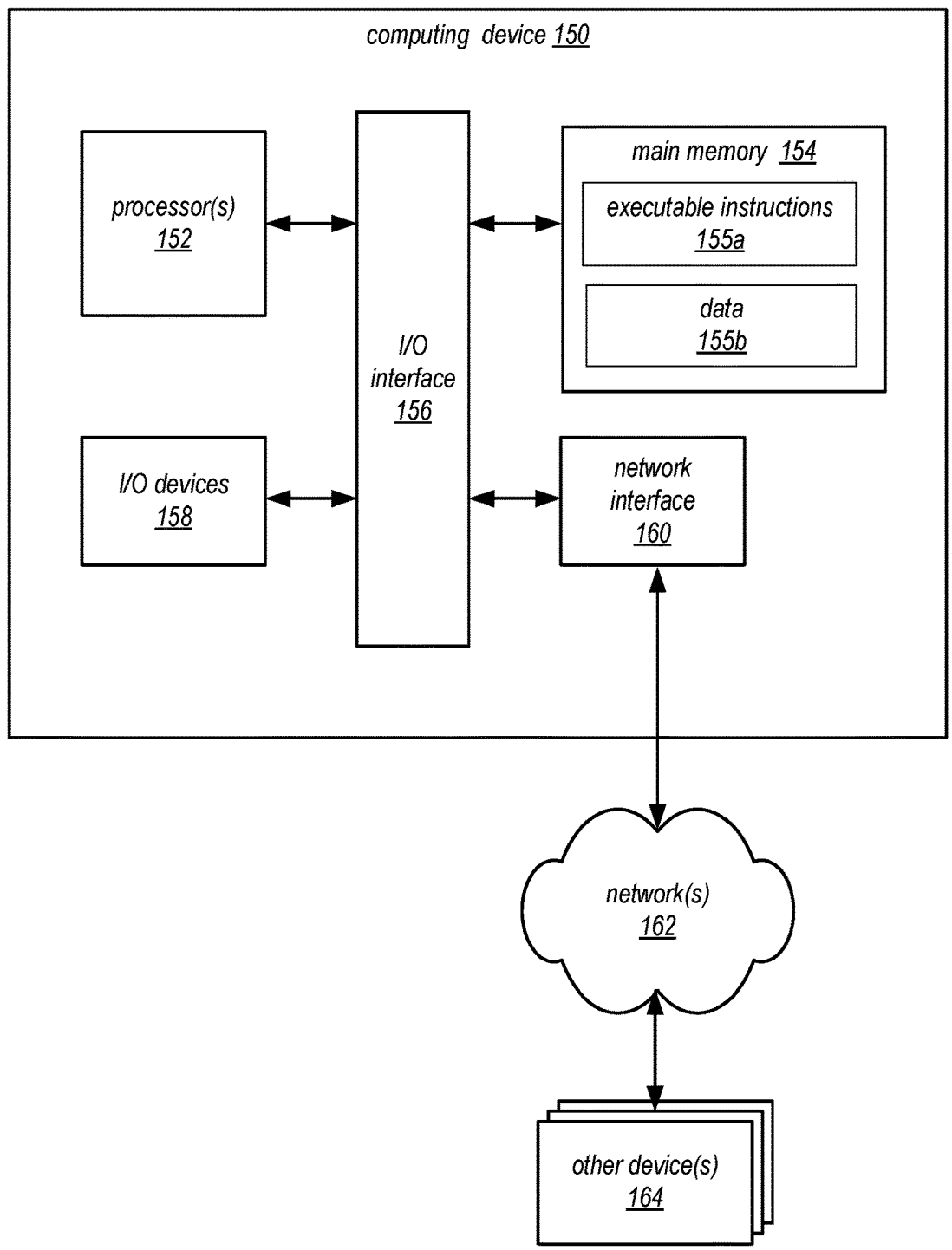
FIG. 1B is a block diagram illustrating an example computing device that may be used in at least some embodiments.
Figure 1C:
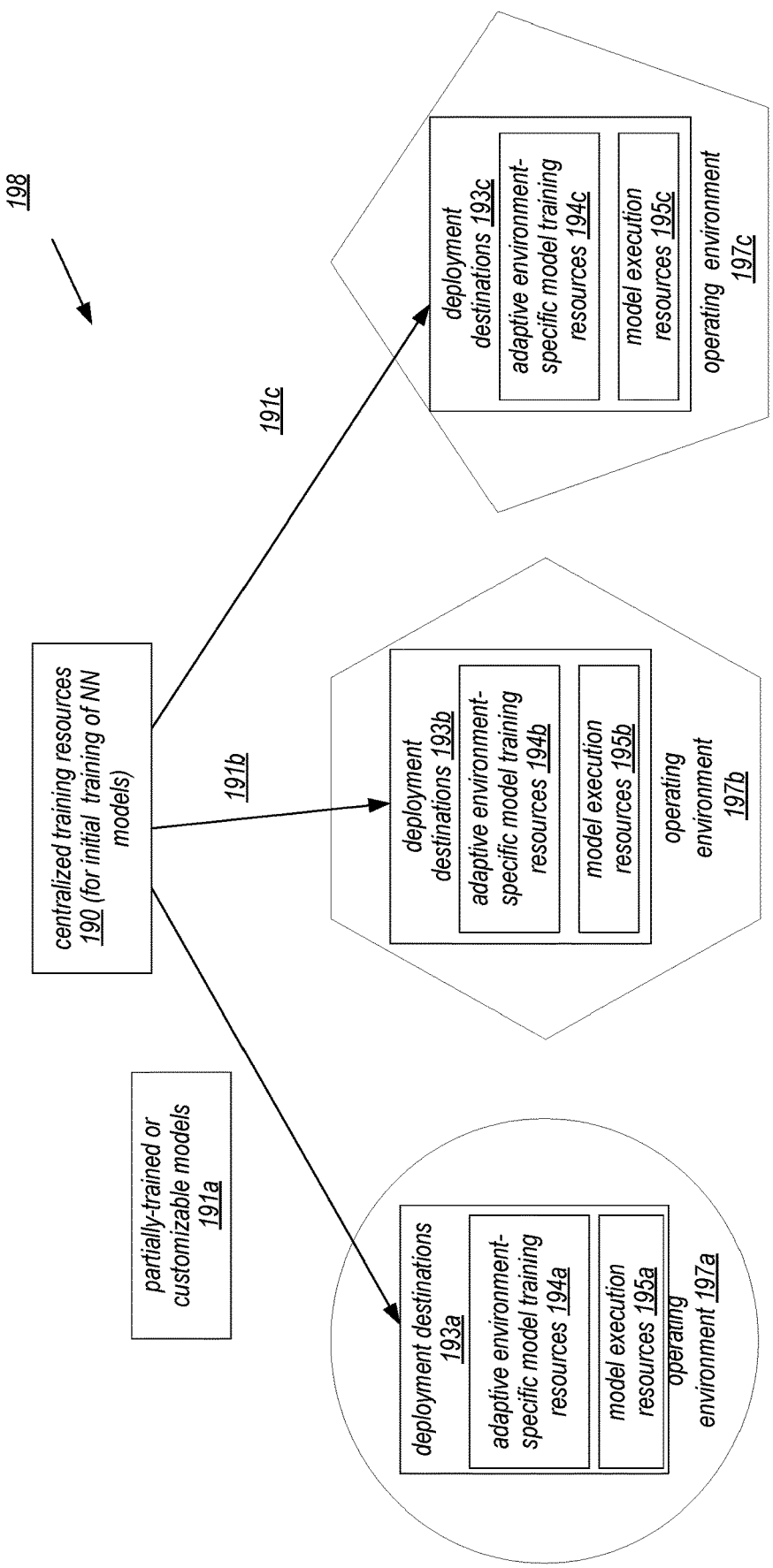
FIG. 1C illustrates an example system environment in which a plurality of model deployment destinations may be associated with respective distinct environments, according to at least some embodiments.

In at least some embodiments, a system and/or server that implements a portion or all of one or more of the methods and/or techniques described herein, including the techniques to capture and process sensor data, to train and/or execute machine learning algorithms including neural network algorithms, to control the operations of sensors, and the like, may be executed on a general-purpose computer system that includes or is configured to access one or more computer-accessible media. FIG. 1B illustrates such a general-purpose computing device 150. In the illustrated embodiment, computing device 150 includes one or more processors 152 coupled to a main memory 154 (which may comprise both non-volatile and volatile memory modules, and may also be referred to as system memory) via an input/output (I/O) interface 156. Computing device 150 further includes a network interface 160 coupled to I/O interface 156, as well as additional I/O devices 158 which may include sensors of various types.

In various embodiments, computing device 150 may be a uniprocessor system including one processor 152, or a multiprocessor system including several processors 152 (e.g., two, four, eight, or another suitable number). Processors 152 may be any suitable processors capable of executing instructions. For example, in various embodiments, processors 152 may be general-purpose or embedded processors implementing any of a variety of instruction set architectures (ISAs), such as the x86, PowerPC, SPARC, or MIPS ISAs, or any other suitable ISA. In multiprocessor systems, each of processors 152 may commonly, but not necessarily, implement the same ISA. In some implementations, graphics processing units (GPUs) may be used instead of, or in addition to, conventional processors.

Memory 154 may be configured to store instructions and data accessible by processor(s) 152. In at least some embodiments, the memory 154 may comprise both volatile and non-volatile portions; in other embodiments, only volatile memory may be used. In various embodiments, the volatile portion of system memory 154 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, executable program instructions 155*a* and data 155*b* implementing one or more desired functions, such as those methods, techniques, and data described above, are shown stored within main memory 154.

In one embodiment, I/O interface 156 may be configured to coordinate I/O traffic between processor 152, main memory 154, and various peripheral devices, including network interface 160 or other peripheral interfaces such as various types of persistent and/or volatile storage devices, sensor devices, etc. In some embodiments, I/O interface 156 may perform any necessary protocol, timing or other data transformations to convert data signals from one component (e.g., main memory 154) into a format suitable for use by another component (e.g., processor 152). In some embodiments, I/O interface 156 may include support for devices attached through various types of peripheral buses, such as a variant of the Peripheral Component Interconnect (PCI) bus standard or the Universal Serial Bus (USB) standard, for example. In some embodiments, the function of I/O interface 156 may be split into two or more separate components. Also, in some embodiments some or all of the functionality of I/O interface 156, such as an interface to memory 154, may be incorporated directly into processor 152.

Network interface 160 may be configured to allow data to be exchanged between computing device 150 and other devices 164 attached to a network or networks 162, such as other computer systems or devices as illustrated in the figures. In various embodiments, network interface 160 may support communication via any suitable wired or wireless general data networks, such as types of Ethernet network, for example. Additionally, network interface 160 may support communication via telecommunications/telephony networks such as analog voice networks or digital fiber communications networks, via storage area networks such as Fibre Channel SANs, or via any other suitable type of network and/or protocol.

In some embodiments, main memory 154 may be one embodiment of a computer-accessible medium configured to store program instructions and data as described herein for implementing embodiments of the corresponding methods and apparatus. However, in other embodiments, program instructions and/or data may be received, sent or stored upon different types of computer-accessible media. Various embodiments may further include receiving, sending or storing instructions and/or data implemented in accordance with the foregoing description upon a computer-accessible medium. Generally speaking, a computer-accessible medium may include non-transitory storage media or memory media such as magnetic or optical media, e.g., disk or DVD/CD coupled to computing device 150 via I/O interface 156. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 150 as main memory 154 or another type of memory. Further, a computer-accessible medium may include transmission media or signals such as electrical, electromagnetic, or digital signals, conveyed via a communication medium such as a network and/or a wireless link, such as may be implemented via network interface 160. Portions or all of multiple computing devices such as that illustrated in the figure may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Figure 10:
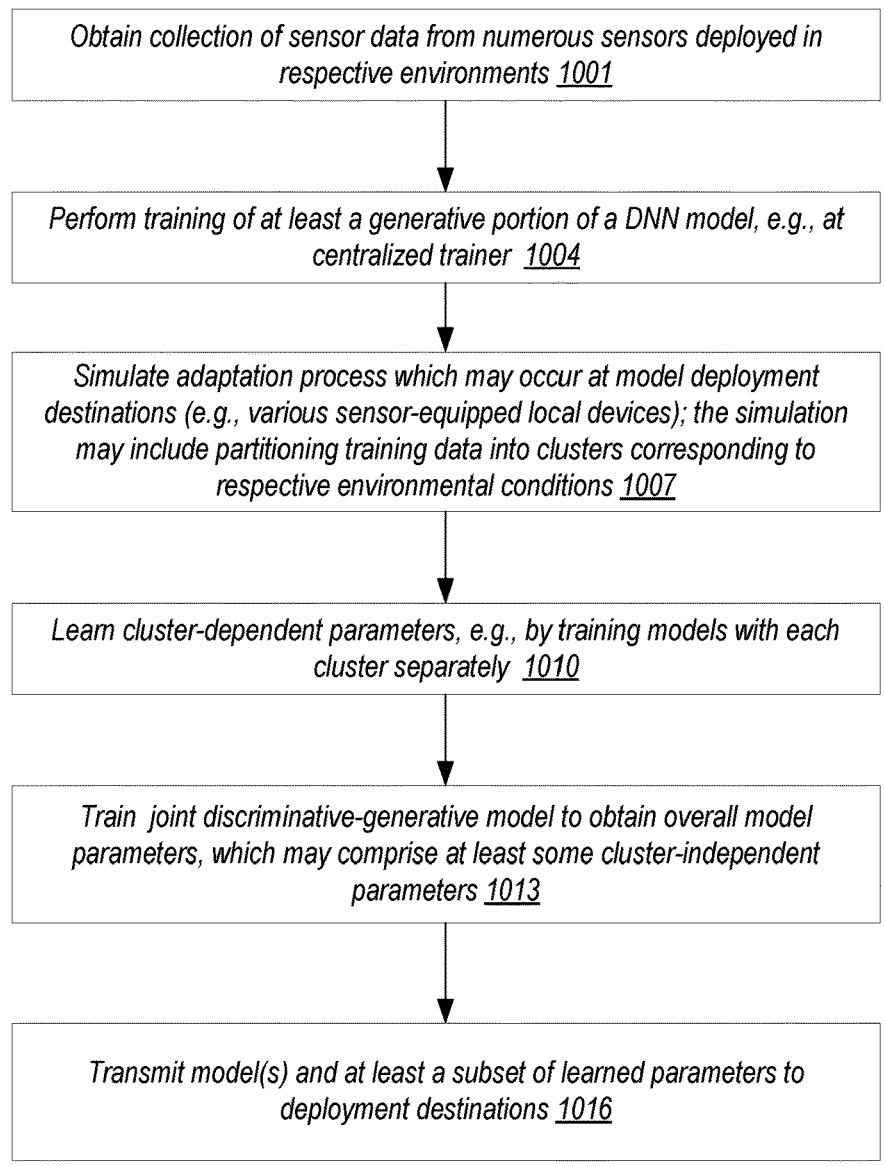
FIG. 10 is a flow diagram illustrating aspects of operations which may be performed to train and deploy a combined discriminative and generative deep neural network model, according to at least some embodiments.

FIG. 10 illustrates an example system environment in which a plurality of model deployment destinations may be associated with respective distinct environments, according to at least some embodiments. As shown, system 198 may comprise a set of centralized training resources 190 for initial or global training of neural network (NN) models. Centralized training resources 190, which may comprise one or more computing devices, may also be referred to as central trainers or initial trainers in various embodiments. Partially-trained and/or customizable NN models 191 (e.g., 191a, 191b, or 191c) may be transmitted from the centralized training resources to respective sets of deployment destinations 193 at different types of operating environments 197. For example, deployment destinations 193a may comprise respective sets of devices which are typically stationary and may comprise smart cameras used for surveillance or the like, deployment destinations 193b may comprise personal mobile devices such as smart phones which are carried by various persons, while deployment destinations 193c may comprise vehicle systems. A variety of model types may be trained at the centralized training resources 190 in different embodiments, often using large training data sets collected from a variety of sources (including numerous sensor devices) over some time period. The model types may, for example, include convolutional networks or layers, deconvolutional networks or layers and/or fully-connected networks or layers. In some embodiments, discriminative NN models (e.g., models used for binary or multi-category classification problems), generative NN models (e.g., models which attempt to learn parameters to reproduce or reconstruct input data sets) or combined discriminative-generative models may be initially trained at the centralized resources. Various combinations of supervised and unsupervised learning algorithms may be employed at the centralized training resources in different embodiments.

The operating environments 197 may differ from one another along a variety of dimensions in the depicted embodiment, such as geographical locations, computing power/memory availability, whether the deployment destinations are movable or stationary, the particular applications for which the NN models are to be used (e.g., object recognition, security management, autonomous driving, and the like), and so on. In some embodiments, respective versions of the partially-trained or customized models 191 (e.g., 191a-191c) may be generated to cater to the different characteristics of the operating environments 197.

In at least some embodiments, while the deployment destination devices may differ from one another in various ways, at least a subset of the deployment destination devices may include respective resources 194 (e.g., 194a, 194b or 194c) for adaptive, environment-specific model training, as well as model execution resources 195 (e.g., 195a, 195b or 195c) to run the models after they have been adapted or customized to the operating environments 197. Any combination of the techniques described herein for customizing models 191 may be employed at a given deployment device in the depicted embodiment, including for example adaptation by removing covariate shift, dynamic gating, continuous training of hybrid models, and the like.

At least some model parameters learned using the large data sets at the centralized resources, together with the models themselves, may be transmitted to the model deployment destinations 193 in various embodiments. The deployment destinations may be equipped with, or have access to, various sensors for collecting information, such as still or video cameras, LIDAR devices, radar devices, temperature sensors and the like. Local data pertaining to the specific operating environments 197 may be obtained from the sensors, and used as input to the algorithms for learning adaptive weights at the deployment destinations 193 in various embodiments. In some embodiments, in which for example the input data available at the deployment destinations is largely or wholly unlabeled, unsupervised learning algorithms may be used to learn at least some of the adaptive weights or parameters. Some of the parameters transmitted from the centralized resources may remain unmodified or fixed while the adaptive parameters are learned in at least some embodiments. In some embodiments at least a subset of the parameters transmitted to the deployment destinations may be referred to as global parameters of the models. After the models have been adapted/customized with the locally-learned parameter values or weights, in various embodiments the models may be used to generate inferences based on new observation data for various applications, such as to make predictions about future events or actions, recognize objects or entities, and so on. The process of local re-training or adaptation may be continuous, with the models being gradually improved over time in some embodiments. In at least one embodiment, at least a portion of the local sensor data collected at or by the model deployment destinations may be transmitted back to the central training resources and added to the repository of input data used for initial/global training of the models.

Adaptation by Removing Covariate Shift

As mentioned earlier, a local adaptation of a neural network model by removing covariate shift may be implemented by a module (e.g., module 110a of FIG. 1A) at an MDD 101, and initially facilitated by another module at a central training resource (e.g., module 133 of FIG. 1A), in at least some embodiments. In particular, in one such embodiment a source domain or environment S and a target domain or environment T may be assumed. In an example scenario in which the sensor devices being used include cameras, S may be a brightly lit room while T is a dimply lit hallway. In another example scenario, S may comprise an indoor airport scene and T may comprise an outdoor urban street or surroundings of a train station. It will be appreciated that other example domains of S and T may be encountered in various embodiments. The system 100 may receive observations X (e.g. video data, and/or other sensor data) and be configured to predict some output Y (e.g. recognizing abnormal activities in the scene). The conditional distribution P(Y|X) may be assumed to be the same in both domains. However, the marginal distributions $P_S(X)$ and $P_T(X)$ may be different. For example, $P_S(X)$ may represent the distribution over surveillance videos collected at airports, whereas $P_T(X)$ may represent the distribution over videos collected at train stations. $P_S(X)$ and $P_T(X)$ may be different due to the different scene types (e.g. the airport scenes compared to train station scenes). This difference may be termed covariate shift. Since the conditional distribution P(Y|X) may be of primary interest in various embodiments, covariate shift may not appear to be a problem. However, the covariate shift may become a problem for P(Y|X, θ) where θ are the model parameters. This is because the learning process that produces the θ may be affected by P(X), as it may be trained to reduce the loss where P(X) is high. Therefore the optimal parameters $θ_S$ might be different from $θ_T$ for the two different domains.

One way to make $θ_S$ work for $x \sim P_T(X)$ in some embodiments is to change the statistics of x such that it looks like a sample from $P_S(X)$ (e.g. adjusting the brightness level of images, adjusting the contrast in the images, adjusting the color scale of the pixels, etc.). In general, if the mean of $P_S$ is $μ_S$ and that of $P_T$ is $μ_T$, then $$x' = x - μ_T + μ_S$$

may appear similar to a sample from $P_S$. However, in various embodiments the distributions may in general be much more complex, and simple adjustment of their means (and variances) may not be sufficient to make a sample from $P_T$ look like a sample from $P_S$. In at least some embodiments, however, the modular structure of deep (multi-layer) neural networks may make it possible to make these adjustments locally at various layers. This is because each layer effectively provides "data" for the next layer in such embodiments. Therefore, it may be possible in such embodiments to control the overall distribution of the data by making small adjustments at one or more layers, or at each layer. This forms the basic intuition behind the proposed approach for removing covariate shift which may be employed in some embodiments.

In at least some embodiments, such a model may implement the following high-level logic. The neural network model may be modified such that for at least some weight layers W preceding a non-linearity the central training resource 104 may add additional scale and bias parameters such as μ, σ, α, and/or β. A model modified in this manner may be termed a flexible neural network ("flex-NN") in some embodiments. The standard operation of a baseline neural network $$y = Wx + b$$

may be replaced in a flex-NN by $$z = (Wx - μ)/α \quad (1)$$

$$y = (z - α)/β \quad (2)$$

where ∥ and σ may be set such that the distribution of z across the training set is a Gaussian distribution with zero mean and identity covariance N(0, 1), and α, β are learned parameters. Since the operations involving the additional parameters are linear, in various embodiments this may be interpreted as a factorization of the overall weight matrix into a dense and a diagonal component where elements of the diagonal component can be set such that the distribution of z can be easily controlled. Such a method may be applied to accelerate the convergence of stochastic gradient descent to enable faster training of neural networks in some embodiments.

Figure 2:
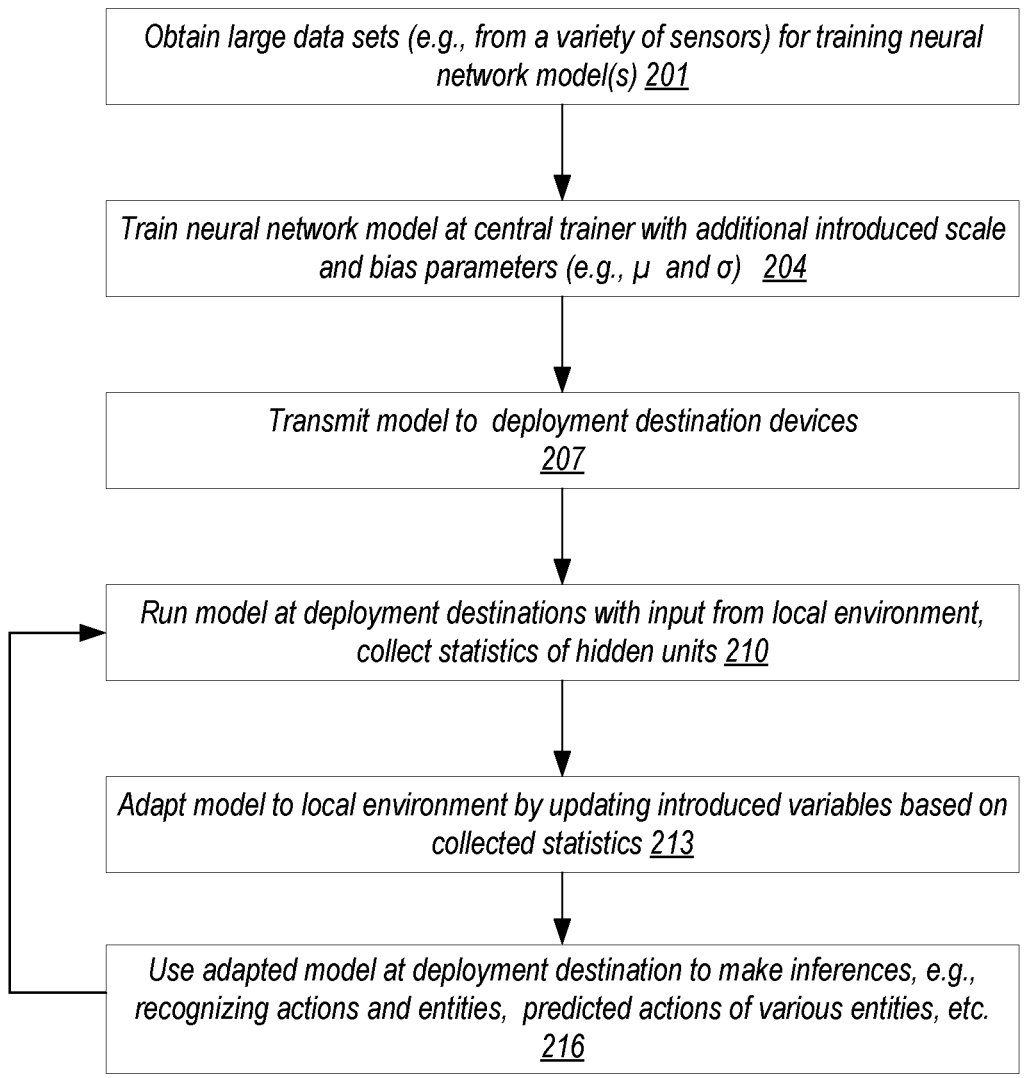
FIG. 2 is a flow diagram illustrating aspects of operations which may be performed to train and execute a neural network model into which one or more scale or bias parameters may be introduced to enable environment-dependent adaptations, according to at least some embodiments.

FIG. 2 is a flow diagram illustrating aspects of operations which may be performed to train and execute a neural network model (e.g., a flex-NN model) into which one or more scale or bias parameters may be introduced to enable environment-dependent adaptations, according to at least some embodiments. As indicated in element 201, large data sets may be obtained from a variety of sensors (e.g., including at least some sensors located at model deployment destinations of the kind discussed above) for training neural network models at a centralized training resource or trainer. A flex-NN model may be trained with additional introduced scale and bias parameters at various layers as discussed above in the depicted embodiment (element 204) at the central trainer. Initially parameters such as μ and σ may be set to the values as determined on a diverse unlabeled collection of videos ($μ_S$ and $σ_S$). As indicated in element 207, the flex-NN model may be transmitted to deployment destination devices such as smart video cameras, smart phones, autonomous vehicles and the like. The deployment destinations may receive and store the models in their respective memories.

In at least some embodiments, a deployment destination may comprise a local covariate shifting module (such as modules 110a and 110b discussed earlier in the context of FIG. 1A). After the flex-NN model has stored and installed at a deployment destination with a particular operating environment, the model may be executed or run with inputs obtained from the local environment, and statistics of the hidden units associated with the introduced parameters may be collected (element 210). The resulting distribution of Wx may be tracked at the deployment destination, e.g., by computing the mean and variance of the states of the hidden units as sampled many times during a day over a period of several days. This statistical information may, for example, be used to estimate new values for μ (the mean) and σ (the variance) so that the distribution of z on the data seen by that deployment destination is a Gaussian distribution with zero mean and identity covariance N(0, 1) in some embodiments. As such, the model may be adapted to the local environment by updating the introduced variables based on the collected statistics (element 213) in various embodiments. In an example embodiment, the mean and variance may be updated at one or more layers of the flex-NN model. The adapted model may be used at the deployment destination to make inferences of various kinds, e.g., to recognize actions or entities, predict actions of various entities, and so on (element 216). The operations corresponding to elements 210-216 may be executed iteratively (e.g., periodically) on a given deployment destination to keep the model updated with the distribution of the local input data in various embodiments. It is noted that the computational requirements for keeping track of the mean and variance of the hidden states may not be very high in some embodiments, and locally collected sensor data may not need to be transmitted to the central trainer in at least some embodiments.

Adaptation by Dynamic Gating

As mentioned earlier, in some embodiments dynamic gating may be used for local adaptation of models at deployment destinations (e.g., using modules 111 and initially facilitated by modules 130 shown in FIG. 1A). In this approach, a deployment destination device may change model parameters depending on the statistics of the environment. Such statistics may, for example in embodiments in which input data comprises image or video data, correspond to various environmental aspects such as brightness level, entropy of the illumination histogram, or low-level texture features of a camera image of the environment. Let $h \in \mathbb{R}^P$ be a function of the statistics of the environment computed by a neural network.

For every neural network layer of the form y=Wx, the central trainer may replace the matrix $W \in \mathbb{R}^{M \times N}$ by a tensor $W \in \mathbb{R}^{M \times N \times P}$. The feedforward operation $$y_j = \sum_{i=1}^{N} x_i w_{ij} \text{ may be replaced by } y_j = \sum_{p=1}^{P} \sum_{i=1}^{N} x_i h_k w_{ijp} \quad (3)$$

In this way, the connection between $x_i$ and $y_j$ may be gated by h in various embodiments. This is equivalent to changing the weight $w_{ij}$ between them to be $\Sigma_p h_k w_{ijp}$. Therefore, the weights of the network may change depending on the environment in which the network is operating. Details of how this idea is applied for on-device adaptation at deployment destinations such as camera-equipped devices are provided below.

Let M represent a "Master" network that the central trainer trains in a way that it can be adapted locally at the deployment destination in various embodiments. The master network M may be trained, for example, using a video data from many different cameras, or a "global" collection of video data or other sensor data. In order to do so, the central trainer may first train a different auxiliary "embedding" network E that learns to represent the general environment of a scene (e.g. a scene represented as pixels in video data) but is invariant to the details of the scene in various embodiments. To generate E, the central trainer may categorize the collected surveillance camera videos into K groups based on the kinds of environments to which they correspond in at least some embodiments. For example, K different environment categories or clusters (e.g. K=100), may span different lighting conditions, mounting locations and scene types with respect to cameras. The central training resource may then train an embedding neural network E that maps each input image to a vector $h \in \mathbb{R}^P$, $\|h\|_2 = 1$ where P may be chosen to be a small number in some embodiments (e.g., P=3).

Figure 3:
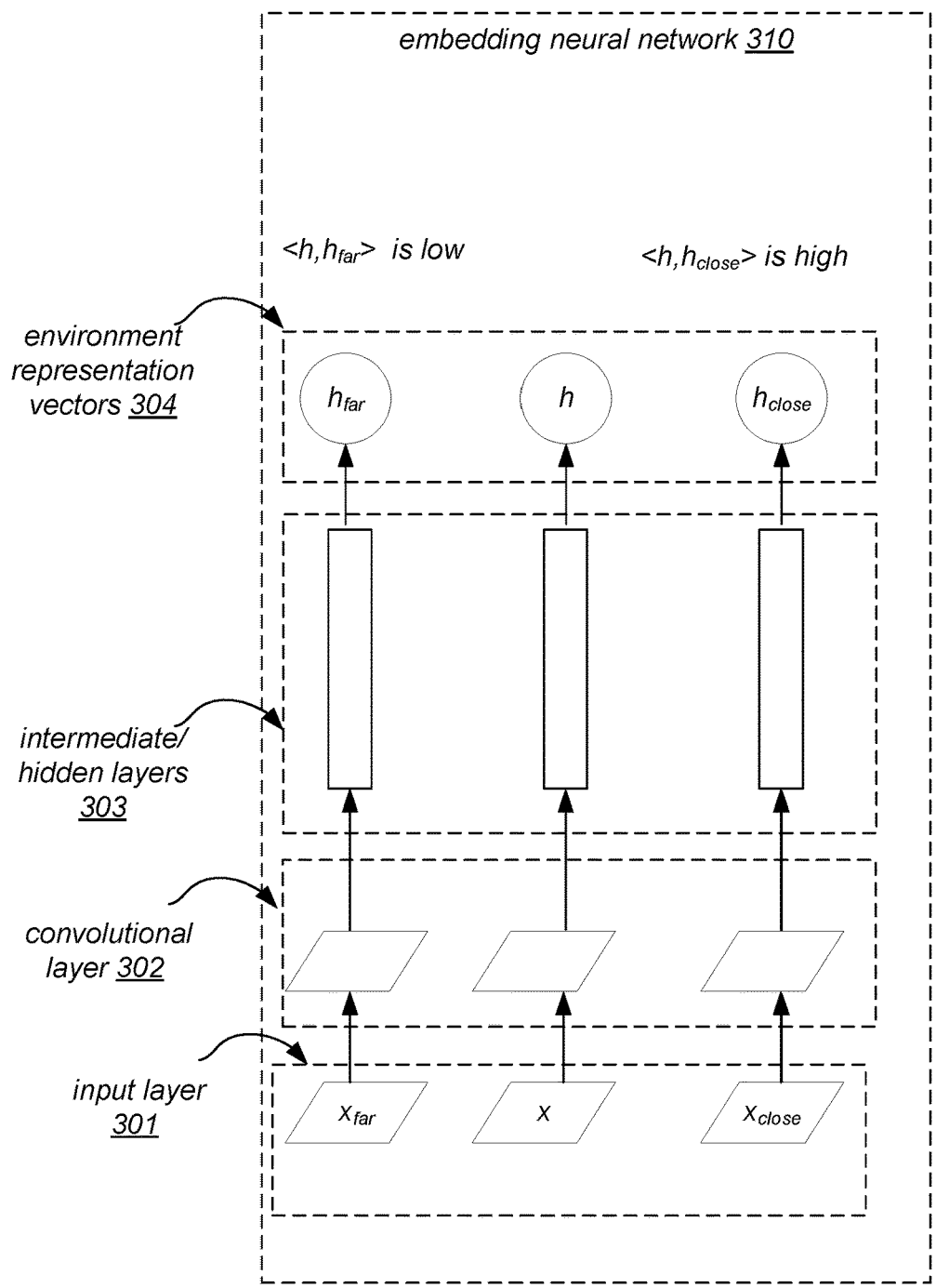
FIG. 3 illustrates an example of the flow of data through an embedding neural network model for learning a representation of the environment, according to at least some embodiments.

FIG. 3 illustrates an example of the flow of data through an embedding neural network model for learning a representation of the environment, according to at least some embodiments. Sensor observations of an input layer 301 may be provided as input into a convolution neural network 302, and then are passed into hidden layers 303 of a DNN in the depicted embodiment. In FIG. 3, observations $x_{close}$ may be obtained from an environment very similar to (or identical to) the environment from which x is obtained, while observations $x_{far}$ may be obtained from a very different environment. The objective function for training this model may map image pairs in the same (or similar) environment category close together (so that $\langle h, h_{close} \rangle$ as indicated below is high), but keep image pairs across different categories far away from each other (decrease $\langle h, h_{far} \rangle$). In the notation used in the embodiment depicted in FIG. 3, $\langle x, y \rangle$ may define a dot-product operation between two vectors x and y. Specifically, given a mini-batch of N training triplets:

$$\{h^{(n)}, h_{close}^{(n)}, h_{far}^{(n)}\}, n=1, \ldots, N$$

the central trainer may optimize the following hinge-loss objective with respect to the parameters e of the embedding network in some embodiments, e.g., using a stochastic gradient descent algorithm:

$$L(\theta) = \min_\theta \sum_{n=1}^{N} \max(0, 1 - \langle h^{(n)}, h_{close}^{(n)} \rangle + \langle h^{(n)}, h_{far}^{(n)} \rangle).$$

For example, in FIG. 3, the observation x may comprise video data of an indoor environment, while the observation $x_{far}$ may comprise video data of an outdoor environment. The observation $x_{close}$ may also comprise video data of an indoor environment, but may have different contrast and brightness values in the video data, compared to the observation x. More generally, "far" or "close" may also be determined by the central trainer using a variety of factors in different embodiments such as sensor values, sensor types, geographic location, and/or other aspects of the environment of the deployment destinations. In the process of training the embedding network 310, in the depicted embodiment the central trainer may discover a latent feature space that represents the environment because it is trained to ignore differences in details and map input (such as images) in the same category close together but separate from input in other categories.

Figure 4:
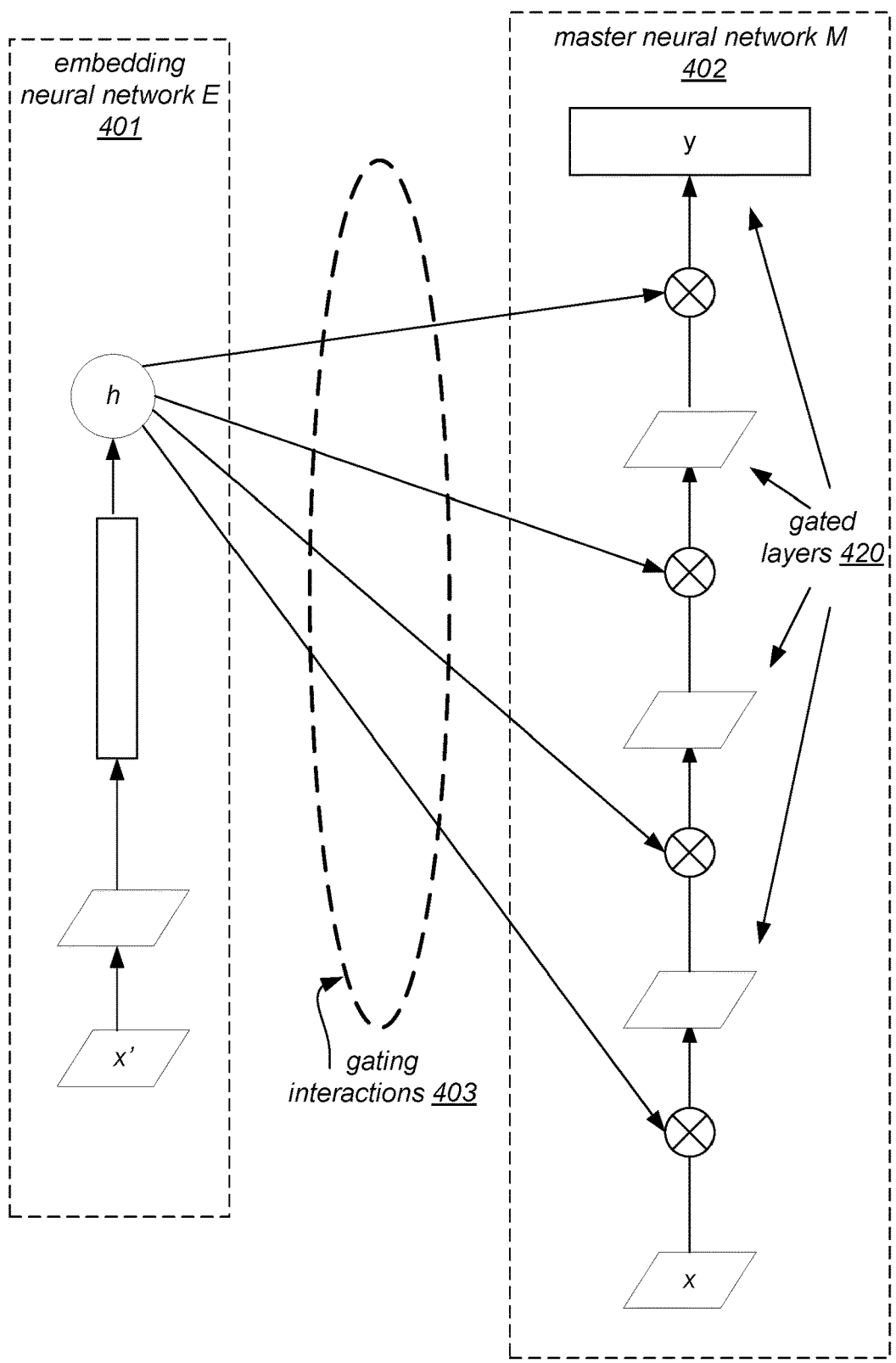
FIG. 4 illustrates an example of a neural network model whose elements may be gated using representations of an environment obtained from an embedding neural network, according to at least some embodiments.

The representation (e.g., the h vectors) obtained from the embedding network model may then be used in various embodiments to gate the connections of a master network M, as indicated in equation (3) above, while the model(s) are trained on the central trainer using data from a wide variety of scenarios. FIG. 4 illustrates an example of a neural network model whose elements may be gated using representations of an environment obtained from an embedding neural network, according to at least some embodiments. In the depicted embodiment, an embedding network 401 may be used to modify the gating of the master network 402. The gating interaction may be represented by the combination of the arrows 403 in the depicted embodiment, representing the application of the conditioning variable h from the embedding network into the master network. A number of different layers 420 of the master network 402 may be affected by the gating in different embodiments, including various hidden or intermediate layers such as convolution, deconvolution or fully-connected layers, and/or an output layer producing the outputs y.

In some embodiments, at the central trainer, the conditioning variable or vector h may be generated by feeding in x' that is a randomly chosen member of the same category (or cluster) as x. In this way, the network is trained to expect a conditioning variable h and use it to maximize performance. In some embodiments, the embedding and master network models, 401 and 402 may be trained jointly. In various embodiments M may be trained to suit a variety of deployment destination devices, even though the deployment destinations may operate in different environments. The embedding neural network model may be referred to as an auxiliary or secondary model in at least some embodiments, as it may in at least some cases be used in conjunction with a master model.

The network E 401 may then be locally adapted on each deployment destination to suit the local environment in at least some embodiments. To perform the adaptation on-device, both M and E networks may first be transmitted to the destination device (e.g., as part of the manufacture of a smart camera, M and E may be incorporated into the computing elements of the camera). After the device is deployed, the E network may be run periodically (e.g. once every minute) on the input sensor data (e.g., image data) being captured locally in some embodiments. The resulting h vectors may then be averaged over these runs to create a representation of the environment. The M network may then be then run by gating it with this averaged h. The environment representation may be updated periodically to keep the model updated with changing environmental conditions. It is noted that although multiplicative gating is illustrated by way of example in FIG. 4, in at least some embodiments other types of gating (such as additive gating) or other types of modulation may be used to adapt M to local conditions.

Figure 5:
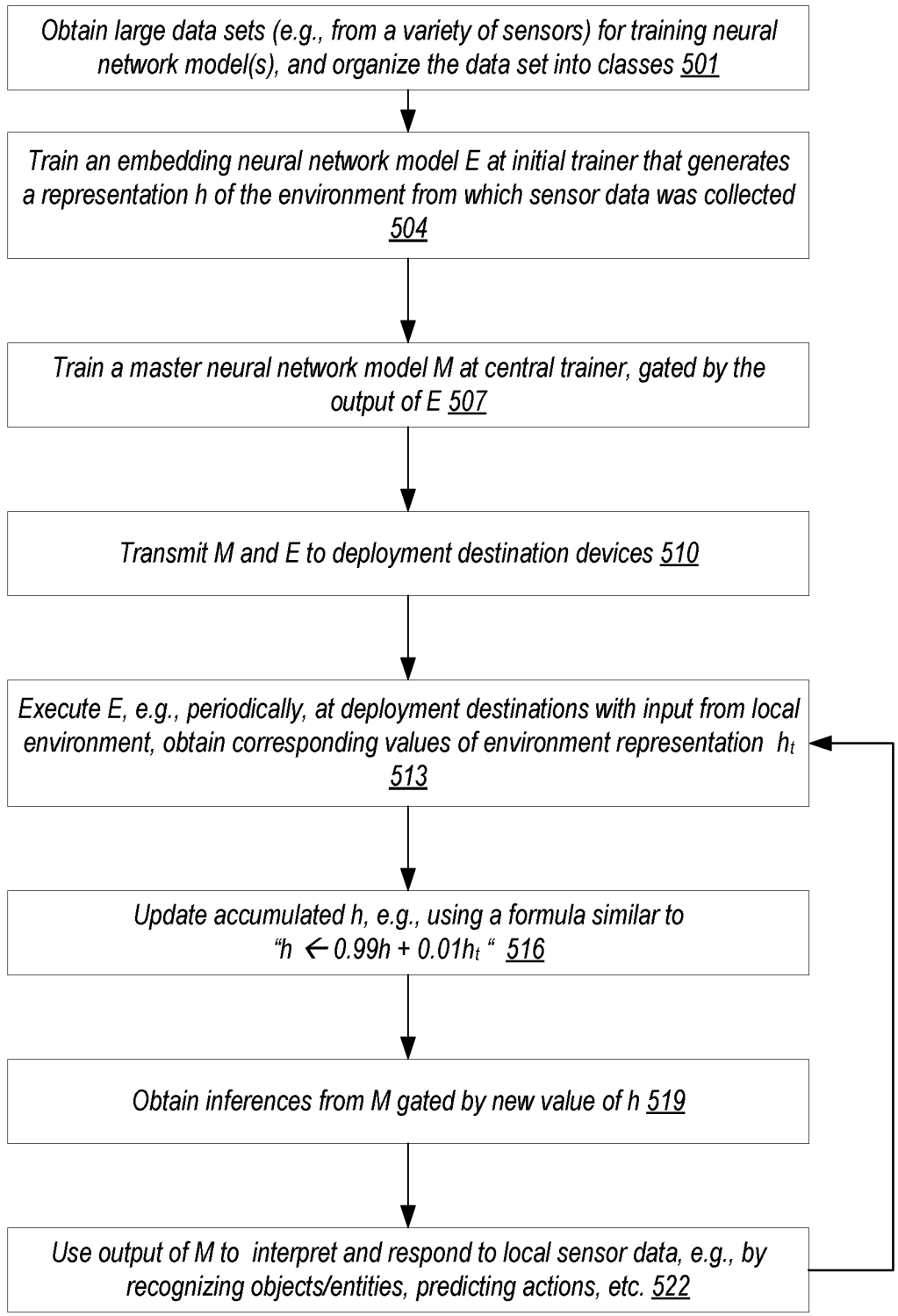
FIG. 5 is a flow diagram illustrating aspects of operations which may be performed to train and utilize a pair of neural network models, such that multiplicative gating based on output from one of the neural network models may be used to adapt at least some parameters of the second neural network, according to at least some embodiments.

FIG. 5 is a flow diagram illustrating aspects of operations which may be performed to train and utilize a pair of neural network models, such that multiplicative gating based on output from one of the neural network models may be used to adapt at least some parameters of the second neural network, according to at least some embodiments. As indicated in element 501, large data sets may be obtained at a central trainer from a variety of sensor-equipped devices (which may include some instances of deployment destination devices) to train neural network models. The data may be organized or categorized into classes corresponding to respective operating environment conditions—e.g., images or videos may be classified based on the ambient lighting conditions, and so on. An embedding neural network model E may be trained using the classified data (element 504) to generate a representation (e.g., a feature vector) h of the environment from which the sensor data of each category was collected.

As indicated in element 507, a master network model M may then be trained at the central trainer, with E's output h being used to gate operations at various layers of M. Both models may then be transmitted to deployment destination devices (element 510) in at least some embodiments. At the deployment destinations, E may be executed iteratively or periodically using input from the local environment (element 513), and corresponding values $h_t$ of h may be obtained at each iteration in the depicted embodiment. An accumulated or running value for h may be updated, e.g., using a weighted formula in which the newly-computed $h_t$ is assigned some weight (e.g., 0.01) relative to the existing earlier value h (element 516) in the depicted embodiment. The accumulated value of parameter vector h may be referred to as an aggregated value in at least some embodiments. It is noted that different update formulas for h may be used in respective implementations; the formula shown in FIG. 5 is not intended to be limiting. Using the version of M which has been adapted by the updated value of h, inferences may be generated based on newly gathered sensor data in the depicted embodiment (element 519). The inferences may be used to interpret and/or respond to the local sensor data representing the deployment destination's environment (element 522), e.g., by recognizing objects or entities, predicting future actions/behaviors, and so on in the depicted embodiment. Operations corresponding to elements 513-522 may be repeated over time, adapting M by gating it using update h values corresponding to changing local conditions in the depicted embodiment.

Adaptation by Continued Local Device Training

Two major types of deep neural networks (DNNs) may be used, sometimes in combination with one another, in various embodiments in which additional adaptation techniques discussed herein are implemented. The first type may be referred to as discriminative DNNs—networks that are trained using supervised learning algorithms which may require at least some labeled examples. The second type may be called generative deep networks—networks that are trained using unsupervised learning, where labeled data may not be needed.

Figure 6:
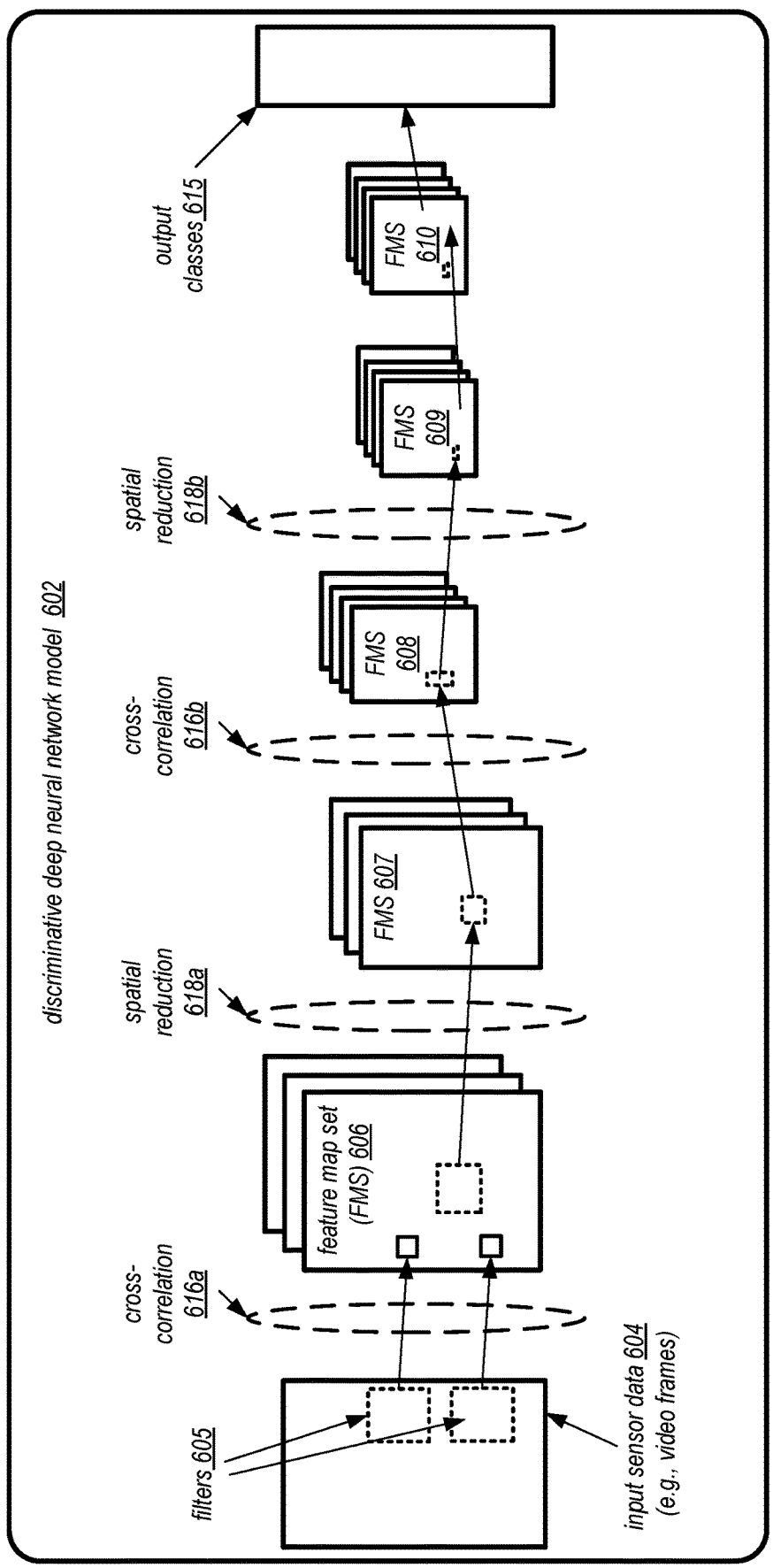
FIG. 6 illustrates an example discriminative deep neural network model, according to at least some embodiments.

FIG. 6 illustrates an example discriminative deep neural network model, according to at least some embodiments. By way of example, the discriminative DNN model 602 may be used for classifying input sensor data such into a set of output classes 615 in the depicted embodiment—e.g., image frames may be classified based on their subject matter such as "animals", "scenery", "houses", "boats", "cars" and the like. Model 602 may comprise an input layer in which a set of filters 605 are applied to input sensor data 604, followed by several layers of alternating cross-correlation computations 616 (e.g., 616a, 616b) and spatial reduction computations 618 (e.g., 618a, 618b). At various stages, respective sets of feature maps (e.g., FMS 606, 607, 608, 609) may be obtained as a result of the transformations applied. In some embodiments, the cross-correlation and spatial reduction layers may be followed by one or more fully connected NN layers before the output classification results 615 are generated.

Figure 7:
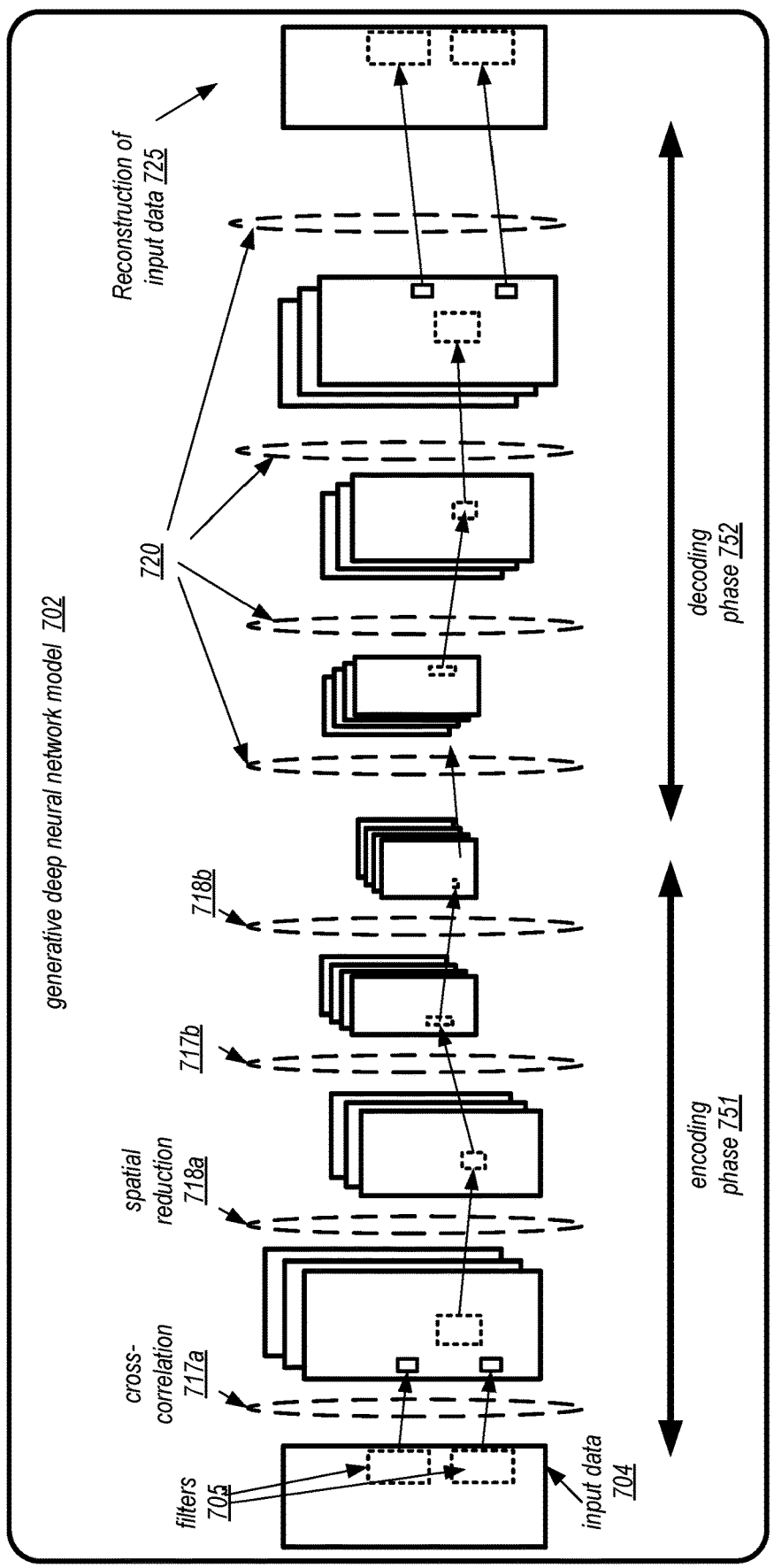
FIG. 7 illustrates an example generative deep neural network model, according to at least some embodiments.

FIG. 7 illustrates an example generative deep neural network model, according to at least some embodiments. The generative DNN model 702 may be used for learning parameters which can be used to reconstruct or reproduce input sensor data (such as video frames) in the depicted embodiment, and may comprise two phases of computations. The first phase, which may be referred to as an encoding phase 751, may be similar in some respects to some of the layers shown in FIG. 6—e.g., filters 705 may be applied to respective subsets of input data 704, followed by several layers of cross-correlation 717 (e.g., 717a and 717b) alternating with spatial reduction (e.g., 718a and 718b). The second phase, which may be called a decoding phase, may take the feature maps produced in the decoding phase, which are assumed to capture various characteristics of the input data, and in effect reverse the sets of transformations of the encoding phase, resulting in output 725 which represents a reconstruction 725 of the input data in the depicted embodiment. At a high level, the transformations 720 may in some sense thus collectively represent the reversal of the transformations of the encoding phase in the depicted embodiment. If, after training, the model 702 is able to reconstruct new input data to a targeted level of accuracy, it may be considered to have learned how to capture key characteristics of the types of sensor data provided as input in various embodiments, and its representations of input data may be used for various purposes such as to help generate predictions regarding future sensor data and so on. In each of models 602 and 702 of FIG. 6 and FIG. 7, respective sets of model parameters such as weights may be learned at each of the layers during training (e.g., the cross-correlation layers, the spatial reduction layers, the fully-connected layers, and so on).

Figure 8:
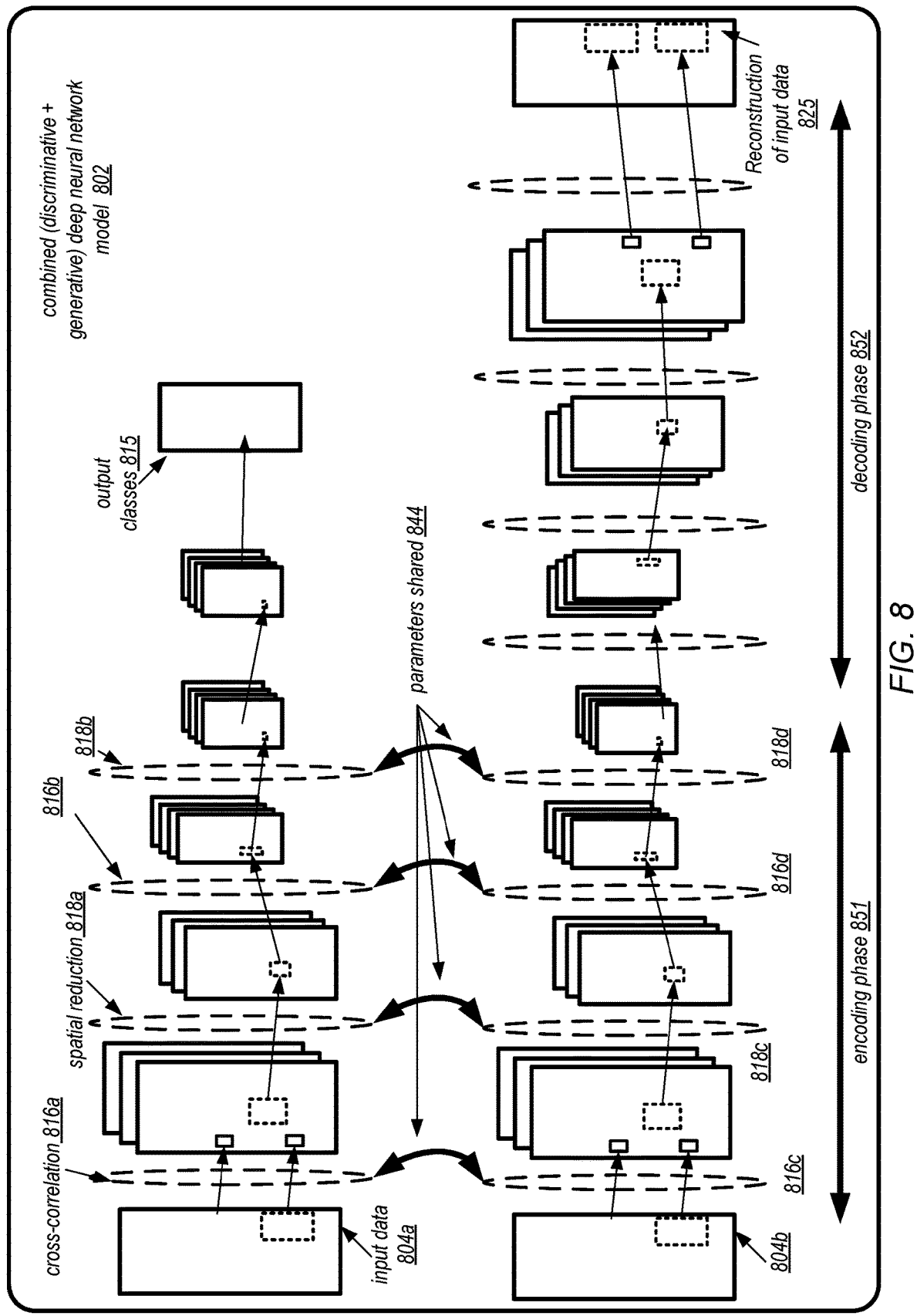
FIG. 8 illustrates an example combined discriminative and generative deep neural network model, according to at least some embodiments.

Under a semi-supervised learning framework, where only a portion of the dataset is annotated with labels, a DNN may be trained using both discriminative and generative objectives in some embodiments. For example, the discriminative DNN may be trained to predict a class label, or recognize abnormal activities in the scene (supervised), while the generative DNN can be trained to reconstruct its own input (unsupervised). In this case, instead of training two separate networks completely independently, model parameters or weights may be shared between the two training regimes, resulting in a single model that can make use of both unlabeled and labeled data. FIG. 8 illustrates an example combined discriminative and generative deep neural network model, according to at least some embodiments. The top half of FIG. 8 shows the discriminative portion of a combined DNN model 802, while the bottom half shows the generative portion. As shown, respective sets of parameters 844 may be shared at corresponding layers of the two portions of the combined model in different embodiment. In at least one embodiment, such joint or combined models may be trained initially at central training resources, transmitted to deployment destinations, and adapted at the deployment destinations as discussed below in further detail.

An example process which may be used for training and deploying combined deep neural networks using shared model parameters similar to parameters 844 may comprise steps similar to the following in some embodiments:

- Train a single DNN in a generative mode with training data which are not annotated with labels (e.g., at a central trainer the server side). This may be referred to as pre-training.
- Train the same DNN in a discriminative mode with annotated/labeled training data (e.g., at the central trainer). This may be referred to as fine-tuning.
- Deploy the DNN (e.g., with the centrally-learned parameters) to destination devices such as cameras, autonomous cars and the like.

In some cases, the trained DNN, at least as initially deployed, may not be adapted to a given deployment destination device. Different deployment destination devices may have slightly different sensors, the placement of those sensors even within the devices may vary and so on. Consider, for example, the large number of different camera types that currently exist from many different manufacturers. There are also many different genres of cameras including web cameras, closed-circuit video cameras, infrared cameras, mobile cameras, etc. Moreover, the context (e.g. background, indoor/outdoor location) and the distributions of objects within a scene may be very different from one camera-equipped device to another. While the difference between sensor statistics might be handled to some extent using some combination of the adaptation techniques described earlier, in at least some embodiments the following approach may be employed for additional adaptation.

- After deployment, the deployment destination device may adapt the DNN to its specific environment by fine-tuning the model, e.g., using unsupervised generative learning. This may lead to the superior model performance on the local device, without the need to communicate any locally-collected data to the central trainer.
- As primarily generative learning may be used locally on the deployment destination device, the bulk of the discriminative training may still be carried out on the central trainer server system before deployment. This framework may generalize to any DNN architecture, including convolutional, deconvolutional, and fully connected deep neural networks.

Figure 9:
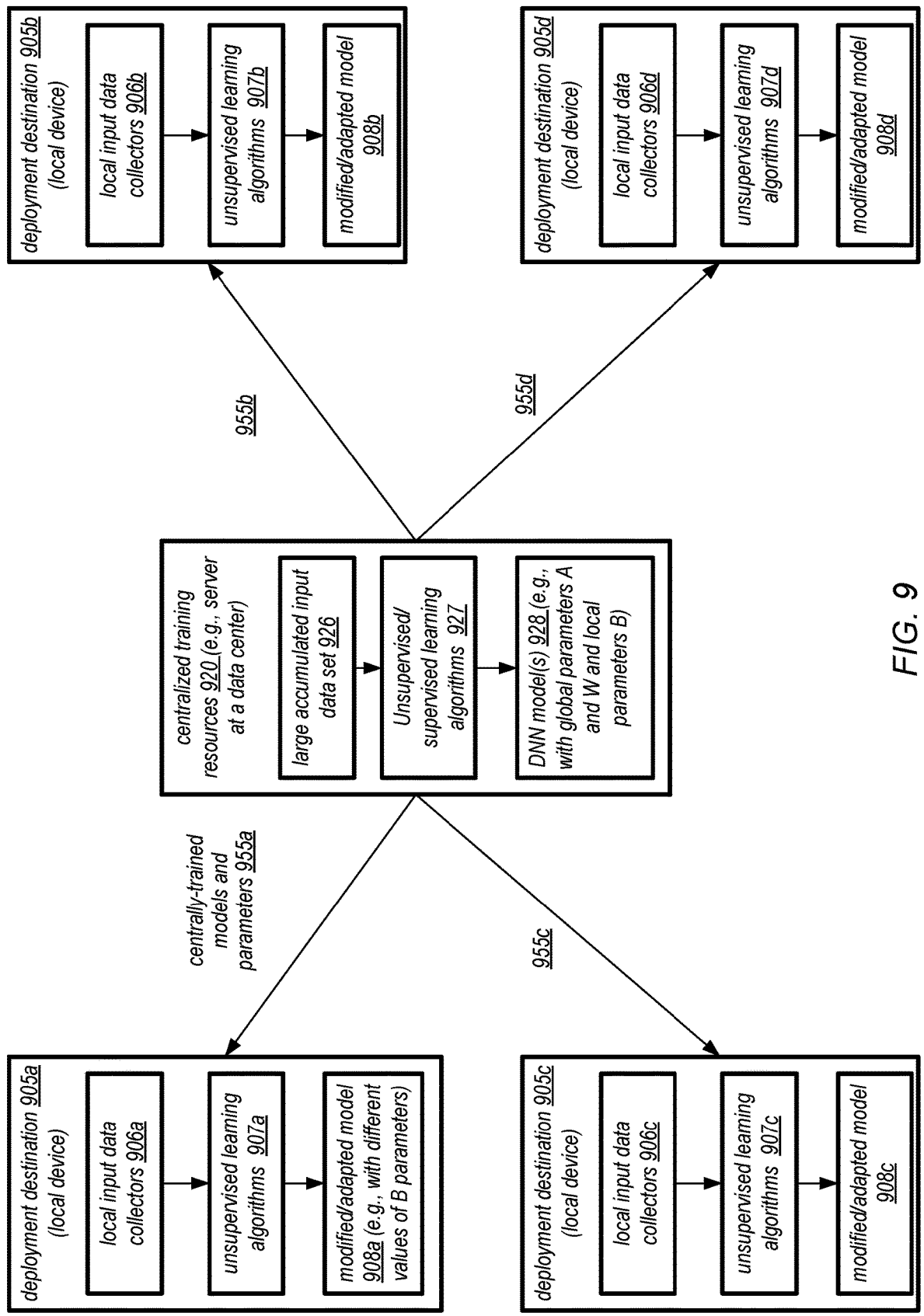
FIG. 9 is a schematic diagram illustrating the deployment of deep neural network models across a plurality of destination devices, according to at least some embodiments.

FIG. 9 is a schematic diagram illustrating the deployment of deep neural network models across a plurality of destination devices, according to at least some embodiments. At centralized training resources 920 such as a server at a data center, a large accumulated input data set 926 may be used to generate one or more DNN models 928. Some combination of unsupervised and supervised training algorithms 927 may be used in the depicted embodiment, and three types of parameters may be learned in at least some embodiments: parameters A and W which are considered global, and local parameters B which may be re-learned, overridden or modified at the deployment destinations. In some embodiments A may represent the contribution to the parameters/weights coming from generative learning, B may represent the contribution from local generative learning and W the contribution from global discriminative learning.

The centrally-trained models and parameters 955 (e.g., 955a — 955d) may be transmitted to various deployment destinations 905 (e.g., local devices 905a-905d). There, input obtained from local data collectors 906 (e.g., 906a-906d) may be gathered, and unsupervised learning algorithms 907 (e.g., 907a-907b) may be used to modify or adapt the local (B) parameters of the model in accordance with the local environment conditions. The modified/adapted models 908 (e.g., 908a-908d) may be used to generate inferences, make predictions, and so on in various embodiments.

FIG. 10 is a flow diagram illustrating aspects of operations which may be performed to train and deploy a combined discriminative and generative deep neural network model, according to at least some embodiments. As indicated in element 1001, a collection of sensor data may be obtained from numerous sensors deployed in respective environments. In one embodiment, some of the input data may, for example, be received from examples of deployment destinations themselves. Training of at least a generative portion of a DNN model may be performed, e.g., at a central trainer (element 1004) in the depicted embodiment using the collected data and an unsupervised learning algorithm. A vector of model parameters A may be obtained from the generative training.

As indicated in element 1007, an adaptation process which may occur at model deployment destinations (such as various sensor-equipped devices) may be simulated at the central trainer. The simulation may, for example, include partitioning the training data into K clusters corresponding to respective environmental categories in the depicted embodiment. The environmental categories may for example, in an embodiment involving the use of cameras or image sensors, span different lighting conditions, mounting locations, geographical locations, scene types and so on. A given cluster may emulate, at the central trainer, a different local device environment in the sense that the data in that cluster corresponds to the data that that local device would be expected to encounter. Note that this emulation step may take place on the central trainer in various embodiments. The number of clusters may vary in different embodiments, and may be considered a tunable meta-parameter in at least some embodiments.

For each cluster k∈K, as indicated in element 1010, a separate training phase may be implemented in some embodiments by only using the data that is available to the partition k. The parameters of the new model are defined as C(k), where $$C(k)=A+B(k)$$

where the parameter vector A is obtained from operations corresponding to element 1004 and is kept fixed, and B(k) represents the cluster dependent adaptation in the weights for k=1, . . . , K. B(k) may be learned using generative learning in an encoding-decoding model similar to that shown in FIG. 7. In some embodiments, the central trainer may constrain the norm of B(k) to be small (e.g. less than or equal to 0.1), which corresponds to a constrained optimization problem. A small norm may restrict the complexity of the cluster dependent adaptive weights B(k).

As indicated in element 1013, in at least some embodiments, given C(k) for all K clusters, the central trainer may train a joint discriminative-generative model similar to that shown in FIG. 8. The overall model parameters for each cluster k may be defined as:

$$U(k)=W+C(k)$$

where W is a shared parameter vector that is independent of cluster k and is optimized using supervised learning. This may help identify a single discriminative adjustment that works for all K clusters is found in various embodiments. This in turn may make it possible to expect good generalization on the deployment destination in various embodiments, where a different B may be determined which is unknown at the central trainer. The operations corresponding to element 1013 may be considered useful in creating the synergy between the two sets of parameters W and B in various embodiments.

After training or convergence of the DNN model at the central trainer, the models and at least a subset of parameters such as A and W may be sent from the server system to the deployment destinations (element 1016). At least some local devices j may compute respective B parameters B(j) locally in some embodiments. The final model parameters used for inference on a given deployment destination in such an embodiment may comprise, for example, U(k)=W++B(j).

Figure 11:
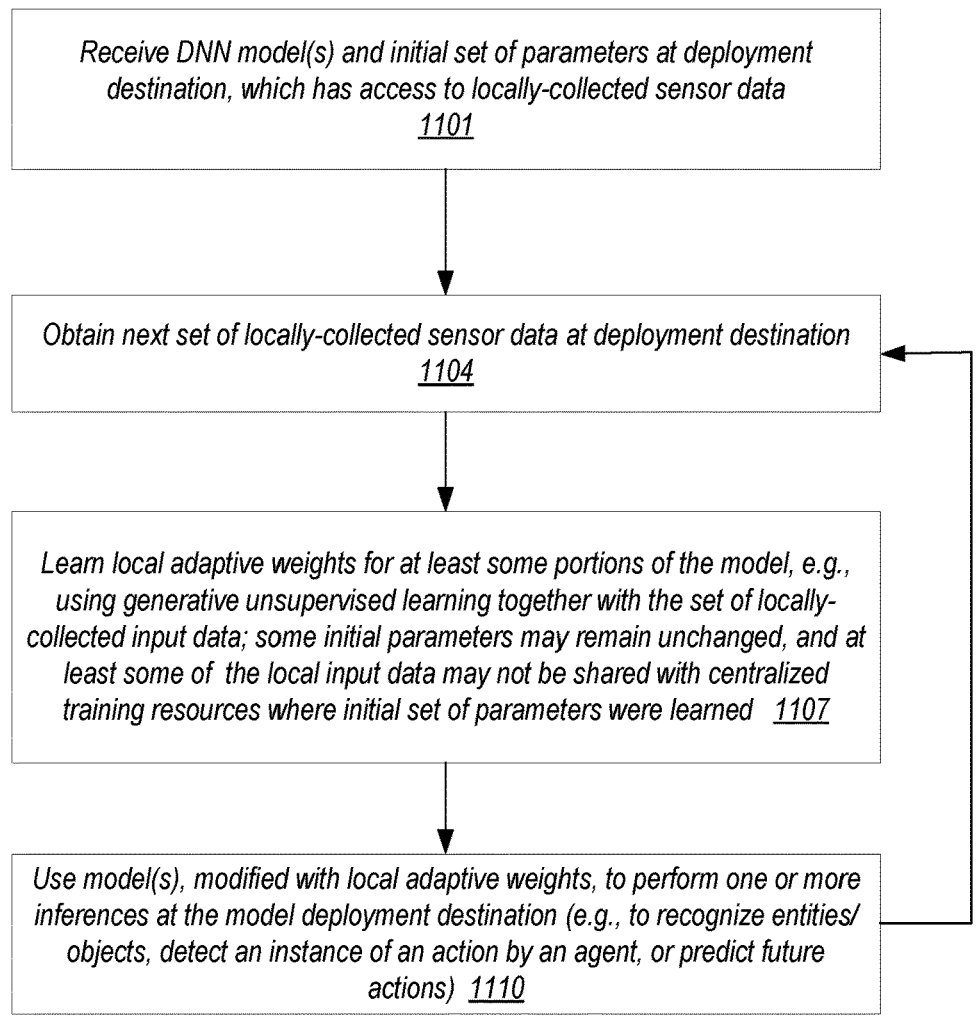
FIG. 11 is a flow diagram illustrating aspects of operations which may be performed at a model deployment destination device to adapt a combined discriminative and generative deep neural network, according to at least some embodiments.

FIG. 11 is a flow diagram illustrating aspects of operations which may be performed at a model deployment destination device to adapt a combined discriminative and generative deep neural network, according to at least some embodiments. It will be appreciated that multiple deployment destination devices may each implement the operations illustrated in FIG. 11 in parallel in some embodiments. As shown in element 1101, one or more DNN models with an initial set of parameters (e.g., similar to parameter vectors A and W described above) may be received at a deployment destination such as a smart phone, smart camera, autonomous vehicle or other local device in the depicted embodiment, e.g., from a central training resource. The deployment destination may be equipped with or have access to locally-collected sensor data (e.g., videos, LIDAR data etc.) in at least some embodiments.

The next set of locally-collected sensor data may be obtained (element 1104). Local adaptive parameters or weights (e.g., similar to weights BU) discussed above) may be learned for at least some portions of the model at the deployment destination (element 1107), while keeping at least some of the initially-provided parameters unchanged or unmodified in the depicted embodiment. In various embodiments, generative unsupervised learning algorithms may be used to learn the adaptive weights. At least some of the locally-collected input data used to learn the adaptive weights may not be shared with or transmitted to the central trainer in the depicted embodiment.

In some embodiments, the parameters of the locally-adapted model may be represented as U(j):

$$U(j)=W+A+B(j)$$

where A and W are fixed parameters obtained from the central trainer, while B(j) represents local adaptive weights. Optimization may be performed at the deployment destination with respect to B(j), while the norm of B(j) may be constrained to be small in at least some embodiments. In some embodiments, if annotated or labeled data are available at the deployment destination, then in addition to B(j), W can also be fine-tuned and adapted, leading to an even more robust model.

After the adaptive weights or parameters have been learned using the current iteration of locally-acquired sensor data, the modified DNN model(s) may be used to perform one or more inferences at the deployment destination—e.g., to recognize entities or objects, to detect an instance of a particular type of action by an agent, to predict future actions or states, and so on, depending on the particular application for which the DNN was designed. Operations corresponding to elements 1104, 1107 and 1110 may be iterated in some embodiments, adapting the DNN model to changing conditions of the deployment destinations.

Hybrid Models

Figure 12:
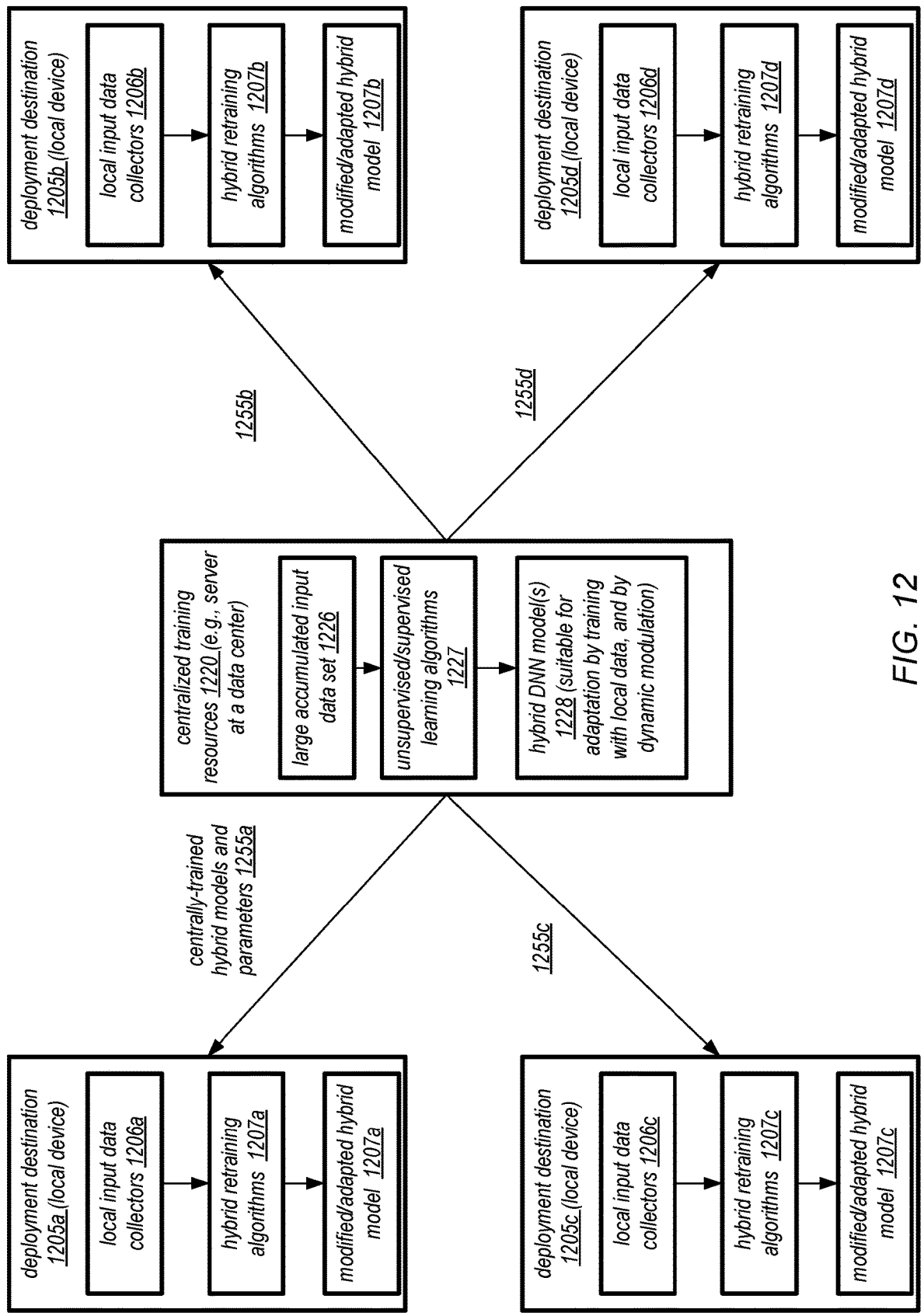
FIG. 12 is a schematic diagram illustrating the deployment of hybrid neural network models across a plurality of destination devices, according to at least some embodiments.

In some embodiments, an approach which combines some of the adaptation techniques discussed above may be employed. FIG. 12 is a schematic diagram illustrating the deployment of hybrid neural network models across a plurality of destination devices, according to at least some embodiments. As shown, a large accumulated input data set 1226 comprising data from numerous sensor devices may be obtained at a set of centralized training resources 1220 such as one or more servers at a data center in the depicted embodiment. A selected algorithm or algorithms 1227, which may include aspects of supervised and unsupervised learning in some cases, may be used to generate one or more hybrid DNN model(s) 1228. The hybrid model 1228 may for example, include an auxiliary embedding model as well as a master model in some cases, enabling adaptation for training by dynamic modulation as well as training with local data, thus combining some or all of the techniques discussed above. The centrally-trained model(s) and at least a subset of their parameters 1255 (e.g., 1255a-1255b) may be transmitted to a plurality of deployment destinations 1205 (e.g., 1205a-1205d) in the depicted embodiment.

At the deployment destinations, input obtained from local data collectors 1206 (e.g., 1206a-1206) may be used in combination with hybrid retraining algorithms 127 (e.g., 1207a-1207d) to obtain parameters of respective modified/adapted hybrid models 1207 (e.g., 1207a-1207d) in various embodiments. The adapted models may then be used to perform inferences of various kinds, to make predictions, classify input data and so on, at the deployment destinations. Any desired combination of the techniques described above, including for example removal of covariate shifting, multiplicative gating using output from an embedding network, the used of cluster-specific and cluster-independent parameters in the context of a combined discriminative-generative model, and so on, may be used in the hybrid approach in various embodiments.

Figure 13:
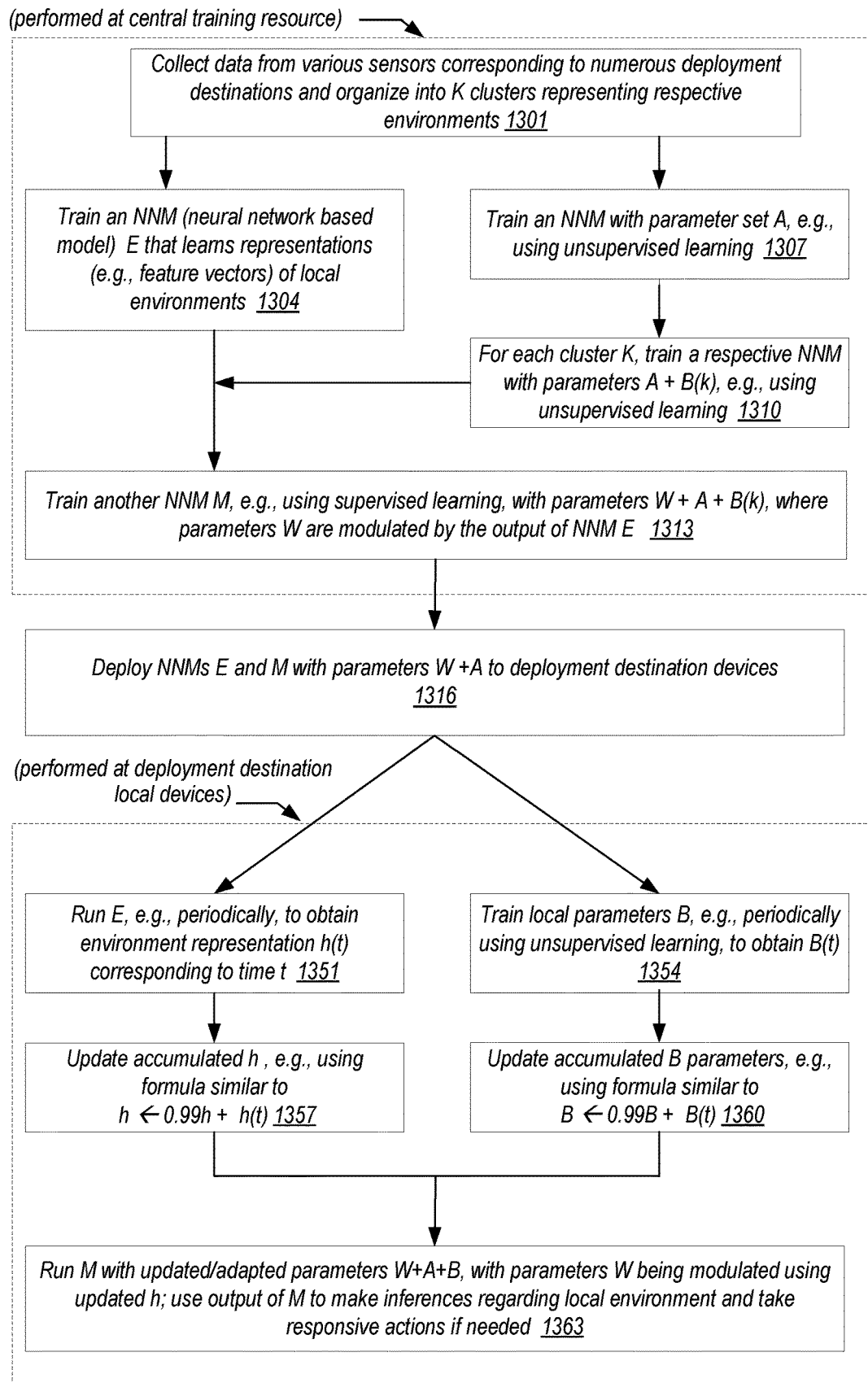
FIG. 13 is a flow diagram illustrating aspects of operations which may be performed to training a hybrid deep neural network model centrally and adapt or retrain the hybrid deep neural network model at various deployment destinations, according to at least some embodiments.

FIG. 13 is a flow diagram illustrating aspects of operations which may be performed to training a hybrid deep neural network model centrally and adapt or retrain the hybrid deep neural network model at various deployment destinations, according to at least some embodiments. As shown, operations corresponding to elements 1301, 1304, 1307, 1310, and 1313 may be performed at central training resources such as servers at one or more data centers in some embodiments, while operations corresponding to elements 1351, 1354, 1357, 1369 and 1363 may be performed at deployment destinations or local devices in such embodiments. As shown in element 1301, data obtained at various sensors (e.g., cameras, LIDAR devices, infra-red sensors and the like) corresponding to a variety of possible or actual deployment destinations may be obtained at the central training resources and organized into K clusters representing respective sets of environment conditions in the depicted embodiment. A neural network model (NNM) E that learns representations (e.g., feature vectors) of local environments may be trained (element 1304), e.g., using environment-specific training data subsets or clusters. In addition, another NNM with a parameter set A may be trained, e.g., using unsupervised learning (element 1307). Then, using the training data corresponding to each of the K clusters, a respective NNM with parameters A+B(k) may be trained, e.g., using unsupervised learning (element 1310).

A master NNM M may be trained in the depicted embodiment, whose parameters comprise W+A+B(k), where the W parameters are modulated using the output of E (element 1313), employing an adaptive gating approach similar to that discussed in the context of FIG. 4. The master model may thus comprise at least some cluster-specific parameters B(k), global parameters A and parameters W (where the W parameters are amenable to modulation) in the depicted embodiment.

The NNM(s) E and M may be deployed, together with the values of W and A, to some number of deployment destination devices in the depicted embodiment. At a given deployment destination, at least two types of adaptations may be implemented in some embodiments. In the first adaptation technique, E may be run periodically, e.g., to obtain respective environment representation vectors $h_t$ corresponding to respective times t (element 1351). An accumulated or running value of h may be updated in each iteration in the depicted embodiment, e.g., using a weighted formula similar to that shown in element 1357. In the second adaptation approach, local versions of parameters B may be generated periodically, e.g., using unsupervised training (element 1354) and locally-collected sensor data. In a manner analogous to the way that the running or accumulated h parameters are updated, B parameters may also be updated iteratively (element 1360) using a weighted updated formula. It is noted that the formulas shown in FIG. 13 are examples and are not meant to be restrictive; in various embodiments, different formulas than those shown in FIG. 13 may be used, and the weights attached to the most recent B or h parameters may not necessarily be identical as shown in the examples.

After the adapted values of h and B are obtained for the current iteration, the master DNN M may be run with the updated parameters at the deployment destination (element 1363). The parameters W may be modulated with the adapted h values, and the locally-generated B parameters may be used in at least some embodiments. After the iteration of adaptive training, the output of M produced using new sensor data (e.g., sensor data that was not used for the adaptive training) may be used to generate inferences regarding local environment and take various responsive actions if needed, depending on the application for which M was designed. In some embodiments, for example, future actions of various entities may be predicted, input may be classified, individuals or entities may be recognized, and so on. The operations corresponding to at least elements 1351-1363 may be repeated as more local input data is collected at the deployment destination in the depicted embodiment, gradually improving M to adapt even more closely to the specific environment in which it is deployed. Several of the operation sequences shown in FIG. 13 may be performed in parallel in various embodiments—e.g., the training of the models indicated in element 1304 may be performed in parallel with the training for parameters A and B(k) at the central trainer, while the execution of E and the determination of local B parameters may be performed in parallel at the deployment destinations. It is noted that in various embodiments, at least some operations other than those illustrated in the flow diagrams of FIG. 2, FIG. 5, FIG. 10, FIG. 11 and/or FIG. 13 may be used to implement the modeling techniques described above. Some of the operations shown may not be implemented in some embodiments or may be implemented in a different order, or in parallel rather than sequentially.

Figure 14:
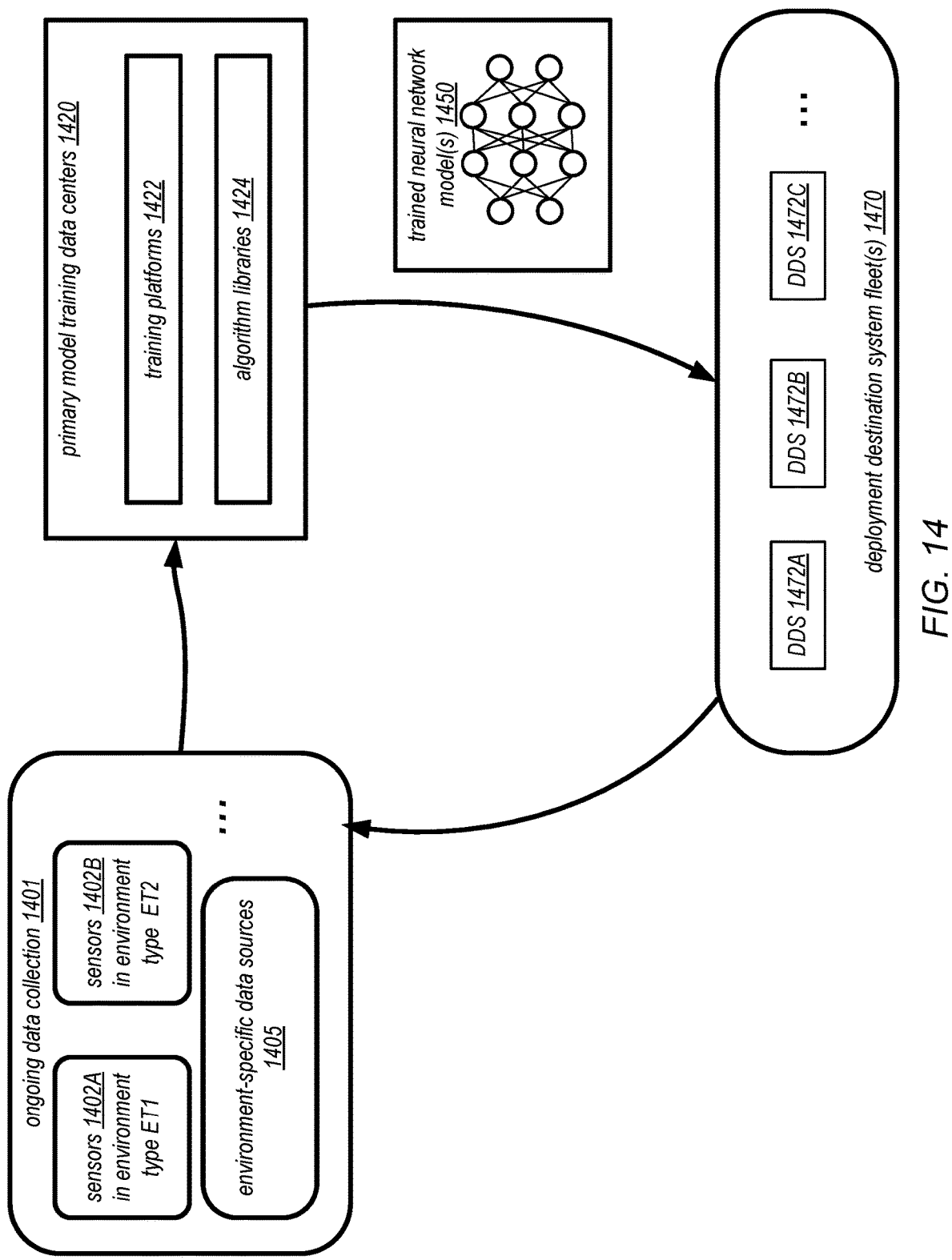
FIG. 14 illustrates the use of adaptive neural network models for a fleet of deployment destination systems, according to at least some embodiments.

FIG. 14 illustrates the use of adaptive neural network models for a fleet of deployment destination systems (e.g. autonomous vehicles), according to at least some embodiments. As shown, as part of a continuous or ongoing data collection procedure 1401, data about driving environments may be collected from a variety of sensors 1402A and 1402B (e.g. vehicle-based sensors) in numerous geographical regions and environment types such as ET1 and ET2. The set of sensors at a given vehicle may comprise, among others, externally-oriented cameras, occupant-oriented sensors (which may, for example, include cameras pointed primarily towards occupants' faces, or physiological signal detectors such as heart rate detectors and the like, and may be able to provide evidence of the comfort level or stress level of the occupants), Global Positioning System (GPS) devices, radar devices, LIDAR devices, sensors associated with vehicle motion-control subsystems such as brakes, accelerator pedals, steering wheels, and so on. In addition to conventional video and/or still cameras, in some embodiment near-infrared cameras and/or depth cameras may be used. In addition to the sensors 1402A and 1402B, data about the environments of the deployment destination systems (e.g. driving environments) may also be collected from environment-specific data sources 1405. In at least some embodiments. Such data sources may include, for example, extra-vehicular databases of traffic laws, accident reports, mapping services and the like, at least some of which may themselves be environment-specific.

The data may be aggregated at one or more primary model training data centers 1420 in the depicted embodiment. The data centers may comprise numerous computing platforms, storage platforms and the like, from which some number of central training platforms 1422 may be selected to train and evaluate DNN-based models using any of a variety of machine learning algorithms of a library 1424. Partially trained models 1450, which may for example comprise implementations of various techniques illustrated earlier, may be transmitted (together with at least some learned parameters) to deployment destination systems 1472 (e.g., DDSs 1472A-1472C) of fleets 1470 in the depicted embodiment.

In some embodiments, each deployment destination system 1472A-C may be an autonomous vehicle. The trained models may be adapted and executed using local computing resources at the autonomous vehicles and data collected by local sensors of the autonomous vehicles, e.g., to predict states or actions of various entities and objects in a vehicle's surroundings at desired time horizons. In some embodiments, the outputs of the adapted DNNs may be used to generate motion control directives to achieve vehicle trajectories which meet safety, efficiency and other desired criteria. At least a subset of the decisions made at the vehicle, as well as the local sensor data collected, may be transmitted back to the data centers as part of the ongoing data collection approach, and used to improve and update the state prediction models in various embodiments. In some embodiments, updated versions of the models may be transmitted to the autonomous vehicle fleet from the data centers periodically, e.g., as improvements in the model accuracy and/or efficiency are achieved, and further adaptations may be performed at the vehicles as and when needed. In at least one embodiment, respective versions of DNN models may be generated for several sub-domains—e.g., one model may be generated for large trucks, another for passenger cars, and so on, and the appropriate models may be transmitted to autonomous vehicles of different types for further local customization. Any combination of the various techniques discussed above for local adaptations may be employed at respective autonomous vehicles in various embodiments, e.g., including removing covariate shifting, modulation using embedding models, hybrid models, and so on.

Figure 15:
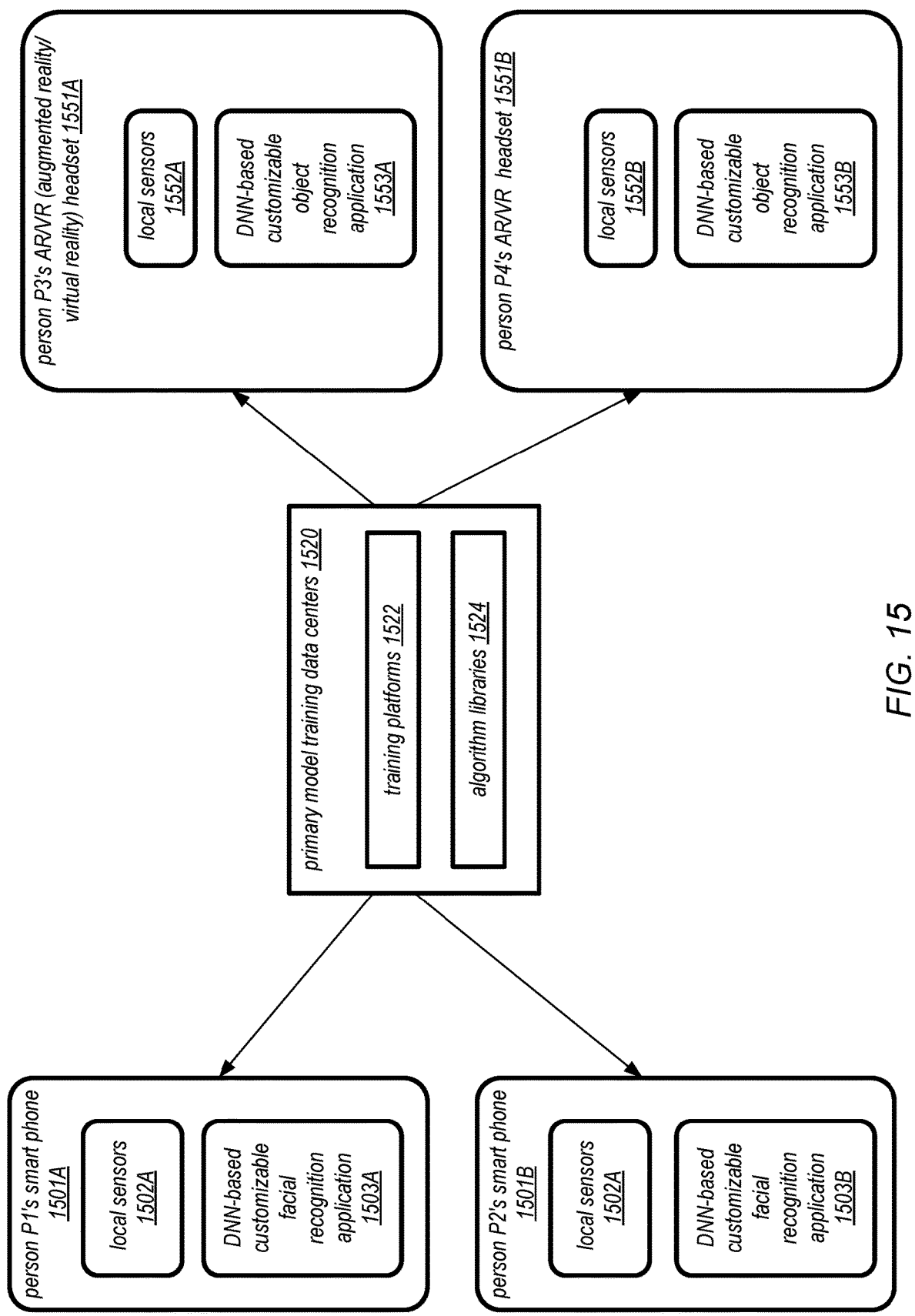
FIG. 15 illustrates the use of adaptive neural network models for smart phones, augmented reality and virtual reality devices, according to at least some embodiments.

FIG. 15 illustrates the use of adaptive neural network models for smart phones, augmented reality and virtual reality devices, according to at least some embodiments. In the depicted embodiment, one or more DNNs similar to those described earlier may be trained using central training platforms 1522 at one or more primary model training data centers 1520 using any of a variety of algorithms of libraries 1524. Respective types of models, along with at least some learned parameters, may be transmitted to at least two types of deployment destination devices in the depicted embodiment: smart phones such as 1501A and 1501B, and AR/VR (augmented/virtual reality) headsets 1551A and 1551B. Each of the deployment destinations may comprise a respective set of local sensors, such as sensors 1502A and 1502B at the smart phones, and sensors 1552A and 1552B at the AR/VR headsets.

In the example scenarios illustrated in FIG. 15, DNN models may be used for facial recognition applications 1503 (e.g., 1503A and 1503B0 at the smart phones 1501, and for object recognition applications 1553A and 1553B at the AR/VR headsets. A partially trained version of the model, received at a smart phone 1501 or a headset 1551 from the central training platforms, may be adapted or customized for the local environment or the specific person using the deployment destination using any combination of the various techniques discussed above for local adaptations in various embodiments, e.g., including removing covariate shifting, modulation using embedding models, hybrid models, and so on.

As discussed above, the techniques for adaptive training of DNN models may be employed either singly or in combination in a variety of scenarios in different embodiments. In an example embodiment, a system is designed to remove covariate shift by factoring each weight matrix of a deep neural network into a dense and diagonal component such that the diagonal component can be easily adapted to data available on a new local device.

In another example embodiment, a system is designed to multiplicatively gate parameters of the global neural network, where the gating is a function of the statistics of the local data received. This approach effectively produces a new set of neural network parameters for any given environment.

In another example embodiment, a system is designed for continued training and adaptation of the DNN parameters on the local device after deployment.

In another example embodiment, a system is designed for both multiplicatively gating parameters and locally retraining the DNN on the local device after deployment.

In yet another example embodiment, different combinations of one or more of the above features may be used to a single joint system.

Other example embodiments are provided below.

In a general example embodiment, a computing system is provided comprising: a server system comprising one or more processors to train a flexible neural network, the flexible neural network comprising a mean parameter, a variance parameter, and multiple learned parameters, and the flexible neural network trained using unlabeled observation data stored in memory on the server system, and the server system further comprising a communication device to transmit the flexible neural network to one or more devices; and a given device of the one or more devices comprising another communication device to receive the flexible neural network, another memory to store the flexible neural network and to store local observation data that is locally obtained by the given device, and one or more processors. The one or more processor on the given device are configured to at least: process the local observation data using the flexible neural network; repeatedly obtain samples of states of hidden layers of the flexible neural network over a period of time; and use the samples to compute new values for the mean parameter and the variance parameter, which are used to generate an adapted flexible neural network for the given device.

In an example aspect, the given device further comprises one or more sensor devices to capture the local observation data. In another example aspect, the given device is in data communication with one or more sensor devices, and obtains the local observation data from the one or more sensors. In another example aspect, the unlabeled observation data and the local observation data are video data, and the given device is a camera device.

In a general example embodiment, a computing device is provided comprising: a communication device configured to receive an initially trained flexible neural network, which comprises a mean parameter, a variance parameter, and multiple learned parameters, and the initially trained flexible neural network was initially trained using unlabeled observation data; a memory device for storing the initially trained flexible neural network and local observation data that is locally obtained by the computing device; and one or more processors. The one or more processors are configured to at least: (a) process the local observation data using the initially trained flexible neural network; (b) repeatedly obtain samples of states of hidden layers of the initially trained flexible neural network over a period of time; (c) use the samples to compute new values for the mean parameter and the variance parameter, which are used to generate an adapted flexible neural network for the computing device; and (d) use the adapted flexible neural network to process new local observation data.

In an example aspect, the operations (b), (c) and (d) are repeated. In an example aspect, the computing device further comprises one or more sensor devices to capture the local observation data and the new local observation data. In an example aspect, the communication device is in data communication with one or more sensor devices, and obtains the local observation data from the one or more sensors devices. In an example aspect, the unlabeled observation data and the local observation data are video data, and the computing device is a camera device which comprises one or more image sensors.

In a general example embodiment, a computing system is provided comprising: a server system comprising one or more processors to train an embedding neural network and, afterwards, a master neural network, where an output of the embedding neural network gates the master neural network, and the embedding and the master neural networks are trained using observation data stored in memory on the server system, and the server system further comprising a communication device to transmit the embedding and the master neural networks to one or more devices; and a given device of the one or more devices comprising another communication device to receive the embedding and the master neural networks, another memory to store the embedding and master neural networks and to store local observation data that is locally obtained by the given device, and one or more processors. The one or more processors of the given device are configured to at least: process the local observation data at different times using the embedded neural network to obtain multiple given outputs; compute a representative output using the multiple given outputs that is specific to the local observation data of the given device; use the representative output to gate the master neural network, to generated an adapted master neural network; and input new locally obtained observation data into the adapted master neural network.

In an example aspect, the given device further comprises one or more sensor devices to capture the local observation data. In an example aspect, the given device is in data communication with one or more sensor devices, and obtains the local observation data from the one or more sensors. In an example aspect, the observation data stored in the memory on the server system and the local observation data are video data, and the given device is a camera device.

In a general example embodiment, a computing device is provided comprising: a communication device configured to receive an initially trained embedded neural network and an initially trained master neural network; a memory device for storing the initially trained embedded and master neural networks and local observation data that is locally obtained by the computing device; and one or more processors. The one or more processors are configured to at least: (a) process the local observation data at different times using the embedded neural network to obtain multiple given outputs; (b) compute a representative output using the multiple given outputs that is specific to the local observation data of the given device; (c) use the representative output to gate the master neural network, to generated an adapted master neural network; and (d) input new locally obtained observation data into the adapted master neural network.

In an example aspect, operations (a), (b), (c) and (d) are repeated. In an example aspect, the computing device further comprises one or more sensor devices to capture the local observation data and the new local observation data. In an example aspect, the communication device is in data communication with one or more sensor devices, and obtains the local observation data from the one or more sensors devices. In an example aspect, the local observation data and the new local observation data are video data, and the computing device is a camera device which comprises one or more image sensors.

In a general example embodiment, a computing system is provided comprising: a server system comprising one or more processors to train a joint deep neural network (DNN), the joint DNN comprising a discriminative DNN, a generative DNN, a first global parameter obtained by the generative DNN, a second global parameter obtained by the discriminative DNN, and a third local parameter obtained by the generative DNN, the joint DNN being trained using observation data stored in memory on the server system, and the server system further comprising a communication device to transmit the joint DNN to one or more devices; and a given device of the one or more devices comprising another communication device to receive the joint DNN embedding and the master neural networks, another memory to store the joint DNN and to store local unlabeled observation data that is unlabeled and locally obtained by the given device, and one or more processors. The one or more processors of the given device configured to at least: process the local observation data at different times using the generative DNN of the joint DNN to obtain one or more values of the third local parameter, the one or more values specific to the local observation data of the given device; generate an adapted joint DNN using the one or more values of the third local parameter, the adapted joint DNN specific to the given device; and input new locally obtained observation data into the adapted joint DNN.

In an example aspect, the given device further comprises one or more sensor devices to capture the local observation data. In an example aspect, the given device is in data communication with one or more sensor devices, and obtains the local observation data from the one or more sensors. In an example aspect, the observation data stored in memory on the server system and the local observation data are video data, and the given device is a camera device.

In a general example embodiment, a computing device is provided comprising: a communication device configured to receive an initially trained joint deep neural network (DNN), the joint DNN comprising a discriminative DNN, a generative DNN, a first global parameter obtained by the generative DNN, a second global parameter obtained by the discriminative DNN, and a third local parameter obtained by the generative DNN; a memory device for storing the initially trained joint DNN and local observation data that is locally obtained by the computing device; and one or more processors. The one or more processors are configured to at least: (a) process the local observation data at different times using the generative DNN of the joint DNN to obtain one or more values of the third local parameter, the one or more values specific to the local observation data of the given device; (b) generate an adapted joint DNN using the one or more values of the third local parameter, the adapted joint DNN specific to the given device; and (c) input new locally obtained observation data into the adapted joint DNN.

In an example aspect, operations (a), (b), and (c) are repeated. In another example aspect, the computing device further comprises one or more sensor devices to capture the local observation data and the new local observation data. In an example embodiment, wherein the communication device is in data communication with one or more sensor devices, and obtains the local observation data from the one or more sensors devices. In an example embodiment, the local observation data is video data, and the computing device is a camera device which comprises one or more image sensors.

In a general example embodiment, a computing system is provided comprising: a server system comprising one or more processors to train a hybrid deep neural network (DNN), the hybrid DNN comprising an unsupervised DNN, an embedding DNN and a master DNN generative DNN, wherein the embedding DNN and the unsupervised DNN are trained before the master DNN, and the unsupervised DNN is trained with a first global parameter and a second local parameter, and the master DNN is trained with the first global parameter, the second local parameter and a third global parameter that is modulated by an output of the embedding DNN; the server system further comprising memory storing observation data that is used to train the hybrid DNN, and further comprising a communication device to transmit at least the hybrid DNN to one or more devices; and a given device of the one or more devices. The given device comprising: another communication device to receive the hybrid DNN, the first and the third global parameters, and the second local parameter; another memory to store the hybrid DNN, the first and the third global parameters, and the second local parameter and to further store local observation data that is unlabeled and locally obtained by the given device, and one or more processors. The one or more processors on the given device are configured to at least: process the local observation data using the embedding DNN to generate a new representative output from the embedding DNN; process the local observation data using the unsupervised DNN to obtain a value of the second local parameter, the value specific to the local observation data of the given device; generate an adapted master DNN with the value of the second local parameter that is specific to the local observation data, with the first global parameter, and with the third global parameter which is modulated by the new representative output from the embedding DNN, the adapted master DNN specific to the given device; and input new locally obtained observation data into the adapted master DNN.

In an example aspect, the given device further comprises one or more sensor devices to capture the local observation data. In another example aspect, the given device is in data communication with one or more sensor devices, and obtains the local observation data from the one or more sensors. In another example aspect, the observation data stored in memory on the server system and the local observation data are video data, and the given device is a camera device.

In another general example embodiment, a computing device is provided comprising: a communication device configured to receive an initially trained hybrid deep neural network (DNN), the initially trained hybrid DNN comprising an unsupervised DNN, an embedding DNN and a master DNN generative DNN, wherein the embedding DNN and the unsupervised DNN were trained before the master DNN, and the unsupervised DNN was trained with a first global parameter and a second local parameter, and the master DNN was trained with the first global parameter, the second local parameter and a third global parameter that was modulated by an output of the embedding DNN; a memory device for storing the initially trained hybrid DNN and local observation data that is locally obtained by the computing device; and one or more processors. The one or more processors are configured to at least: (a) process the local observation data using the embedding DNN to generate a new representative output from the embedding DNN; (b) process the local observation data using the unsupervised DNN to obtain a value of the second local parameter, the value specific to the local observation data of the given device; (c) generate an adapted master DNN with the value of the second local parameter that is specific to the local observation data, with the first global parameter, and with the third global parameter which is modulated by the new representative output from the embedding DNN, the adapted master DNN specific to the given device; and (d) input new locally obtained observation data into the adapted master DNN.

In an example aspect, operations (a), (b), (c) and (d) are repeated. In another example aspect, operations (a) and (b) occur in parallel. In another example aspect, the computing device further comprises one or more sensor devices to capture the local observation data and the new local observation data. In another example aspect, the communication device is in data communication with one or more sensor devices, and obtains the local observation data from the one or more sensors devices. In another example aspect, the local observation data is video data, and the computing device is a camera device which comprises one or more image sensors.

It will be appreciated that any module or component exemplified herein that executes instructions or operations may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data, except transitory propagating signals per se. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the systems, devices, and servers described herein, or accessible or connectable thereto. Any application or module herein described may be implemented using computer readable/executable instructions or operations that may be stored or otherwise held by such computer readable media.

It will also be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the computer processes, the flow charts and the diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

What is claimed is:

1. A system, comprising:
   a model trainer comprising a first set of one or more computing devices; and
   one or more model deployment destinations, including a first model deployment destination comprising a second set of one or more computing devices;
   wherein the model trainer comprises instructions that when executed on one or more processors cause the first set of one or more computing devices to:
   train, using a first input data set comprising data collected from a plurality of sensors, a first neural network based model;
   transmit at least a first set of parameters of the first neural network-based model to the first model deployment destination; and wherein the first model deployment destination comprises instructions that when executed on one or more processors cause the second set of one or more computing devices to:
- determine, using a second input data set and an unsupervised learning algorithm, one or more adaptive parameters for the first neural network based model, wherein at least a subset of the first set of parameters remains unmodified by unsupervised learning; and
- generate, using a version of the first neural network based model comprising the one or more adaptive parameters, at least one inference.

2. The system as recited in claim 1, wherein to train the first neural network based model, the model trainer comprises instructions that when executed cause the first set of one or more computing devices to:
- partition the first input data set into a plurality of clusters, wherein a first cluster of the plurality of clusters corresponds to a first set of environmental conditions associated with one or more model deployment destinations, and wherein a second cluster of the plurality of clusters corresponds to a second set of environmental conditions associated with one or more model deployment destinations; and
- learn a respective cluster-dependent group of model parameters corresponding to one or more clusters of the plurality of clusters;
- learn a cluster-independent parameter using the cluster-dependent groups of model parameters, wherein the cluster-independent parameter is included in the first set of parameters transmitted to the first model deployment destination.

3. The system as recited in claim 2, wherein at least a first cluster-dependent group of model parameters of the respective cluster-dependent groups of model parameters is learned using unsupervised learning.

4. The system as recited in claim 2, wherein the cluster-independent parameter is learned using supervised learning.

5. The system as recited in claim 1, wherein the first neural network based model comprises one or more of: (a) a convolutional neural network, (b) a deconvolutional neural network, or (c) a fully-connected neural network.

6. The system as recited in claim 1, wherein the first neural network model comprises one or more of: a generative neural network or a discriminative neural network.

7. The system as recited in claim 1, wherein the first deployment destination comprises a particular sensor of the plurality of sensors.

8. The system as recited in claim 1, wherein the second input data set comprises additional data collected from a particular sensor of the first deployment destination.

9. The system as recited in claim 1, wherein the plurality of sensors comprise a sensor for capturing one or more of: video data, still image data, LIDAR (light detection and ranging) data, radar data, audio data, biometric data, pressure data, temperature data, infrared data, speed data, traffic data, or communications data.

10. The system as recited in claim 1, wherein the first deployment destination comprises a device attached to a vehicle.

11. A method, comprising:
performing, by one or more computing devices:
- training, at a first model trainer, using a first input data set, one or more neural network based models;
- transmitting at least a first set of parameters of a first neural network-based model of the one or more neural network based models to a first model deployment destination;
- determining, at the first model deployment destination, using a second input data set and an unsupervised learning algorithm, one or more adaptive parameters for at least one model of the one or more neural network based models, wherein at least a subset of the first set of parameters remains unmodified by the unsupervised learning; and
- generating, at the first model deployment destination, using at least one model of the one or more neural network based models and the one or more adaptive parameters, at least one inference.

12. The method as recited on claim 11, wherein the one or more neural network-based models include a master model and an auxiliary model, wherein the auxiliary model emulates an environment associated with one or more deployment destinations, and wherein the master model is gated at least in part by an output of the auxiliary model.

13. The method as recited in claim 12, wherein said determining, at the first deployment destination, the one or more adaptive parameters comprises executing one or more iterations of the auxiliary model.

14. The method as recited in claim 11, further comprising performing, at the one or more computing devices:
- sampling, at the first deployment destination, a state of one or more hidden units of the one or more neural network based models, wherein the one or more adaptive parameters comprise a parameter whose value is modified based at least in part on a statistical metric obtained using a result of said sampling.

15. The method as recited in claim 11, wherein the second input data set comprises a representation of a sensor output obtained at the first model deployment device.

16. A non-transitory computer-readable storage medium storing instructions that when executed on one or more processors cause the one or more processors to:
- determine, at a model deployment destination, that at least a first set of parameters of one or more neural network based models has been received from a trainer resource, wherein at least a portion of training of the one or more neural network based models is performed at the trainer resource using a first input data set;
- obtain, at the model deployment destination, using a second input data set and an unsupervised learning algorithm, one or more adaptive parameters for at least one model of the one or more neural network based models, wherein at least a subset of the first set of parameters remains unmodified by the unsupervised learning; and
- generate, at the model deployment destination, using at least one model of the one or more neural network based models and the one or more adaptive parameters, at least one inference.

17. The non-transitory computer-readable storage medium as recited in claim 16, wherein the second input data set comprises data collected from a sensor accessible from the model deployment destination.

18. The non-transitory computer-readable storage medium as recited in claim 16, wherein the second input data set comprises data collected from a sensor for capturing one or more of: video data, still image data, LIDAR (light detection and ranging) data, radar data, audio data, biometric data, pressure data, temperature data, infrared data, speed data, traffic data, or communications data.

19. The non-transitory computer-readable storage medium as recited in claim 16, wherein the one or more neural network models comprise a combined discriminative and generative neural network.

20. The non-transitory computer-readable storage medium as recited in claim 16, wherein to obtain the one or more adaptive parameters, the instructions when executed on the one or more processors cause the one or more processors to:
- run one or more iterations of an embedding neural network to obtain respective parameter vectors which correspond to an operating environment of the model deployment destination;
- modify, using a weighted update formula, an aggregate value of the parameter vector; and
- utilize the aggregate value to modulate one or more operations of a second neural network model.

\* \* \* \* \*